United States Patent
McMahon et al.

(10) Patent No.: US 11,508,365 B2
(45) Date of Patent: Nov. 22, 2022

(54) DEVELOPMENT OF VOICE AND OTHER INTERACTION APPLICATIONS

(71) Applicant: Voicify, LLC, Boston, MA (US)

(72) Inventors: Jeffrey K. McMahon, Boston, MA (US); Robert T. Naughton, Wellesley, MA (US); Nicholas G. Laidlaw, Needham, MA (US); Alexander M. Dunn, Wilmington, MA (US); Gavin Berkowitz, Cambridge, MA (US)

(73) Assignee: Voicify, LLC, Boston, MA (US)

( * ) Notice: Subject to any disclaimer, the term of this patent is extended or adjusted under 35 U.S.C. 154(b) by 0 days.

(21) Appl. No.: 16/544,375

(22) Filed: Aug. 19, 2019

(65) Prior Publication Data

US 2021/0056962 A1 Feb. 25, 2021

(51) Int. Cl.
| | |
|---|---|
| *G10L 15/22* | (2006.01) |
| *G06F 16/242* | (2019.01) |
| *G10L 15/18* | (2013.01) |
| *H04M 3/493* | (2006.01) |

(52) U.S. Cl.
CPC ............ *G10L 15/22* (2013.01); *G06F 16/243* (2019.01); *G10L 15/1815* (2013.01); *G10L 15/1822* (2013.01); *H04M 3/4938* (2013.01); *G10L 2015/223* (2013.01); *G10L 2015/225* (2013.01); *G10L 2015/228* (2013.01)

(58) Field of Classification Search
CPC ............... G06F 3/167; G10L 15/1822; G10L 2015/223
See application file for complete search history.

(56) References Cited

U.S. PATENT DOCUMENTS

| | | | |
|---|---|---|---|
| 7,434,162 B2 | 10/2008 | Gorelov et al. | |
| 7,610,547 B2 | 10/2009 | Wang et al. | |
| 8,239,206 B1 * | 8/2012 | LeBeau ................. | H04M 1/271 |
| | | | 704/275 |
| 8,972,260 B2 | 3/2015 | Weng et al. | |
| 9,996,531 B1 | 6/2018 | Parastatidis et al. | |
| 10,235,999 B1 | 3/2019 | Naughton et al. | |
| 10,332,513 B1 | 6/2019 | D'Souza et al. | |
| 10,614,800 B1 | 4/2020 | McMahon et al. | |
| 2002/0087655 A1 | 7/2002 | Bridgman et al. | |
| 2003/0046316 A1 | 3/2003 | Gergic et al. | |
| 2003/0225825 A1 | 12/2003 | Healey et al. | |

(Continued)

OTHER PUBLICATIONS

Orbita.ai [online], "Orbita Voice Dialog Editor", Published on or before Aug. 19, 2019 [retrieved on Aug. 26, 2019], retrieved from URL<https://orbita.ai/orbita-voice-dialog-editor/>, 4 pages.

(Continued)

*Primary Examiner* — Mark Villena
(74) *Attorney, Agent, or Firm* — Fish & Richardson P.C.

(57) ABSTRACT

Among other things, a developer of an interaction application for an enterprise can create items of content to be provided to an assistant platform for use in responses to requests of end-users. The developer can deploy the interaction application using defined items of content and an available general interaction model including intents and sample utterances having slots. The developer can deploy the interaction application without requiring the developer to formulate any of the intents, sample utterances, or slots of the general interaction model.

20 Claims, 13 Drawing Sheets

(56) References Cited

U.S. PATENT DOCUMENTS

Figure 1:
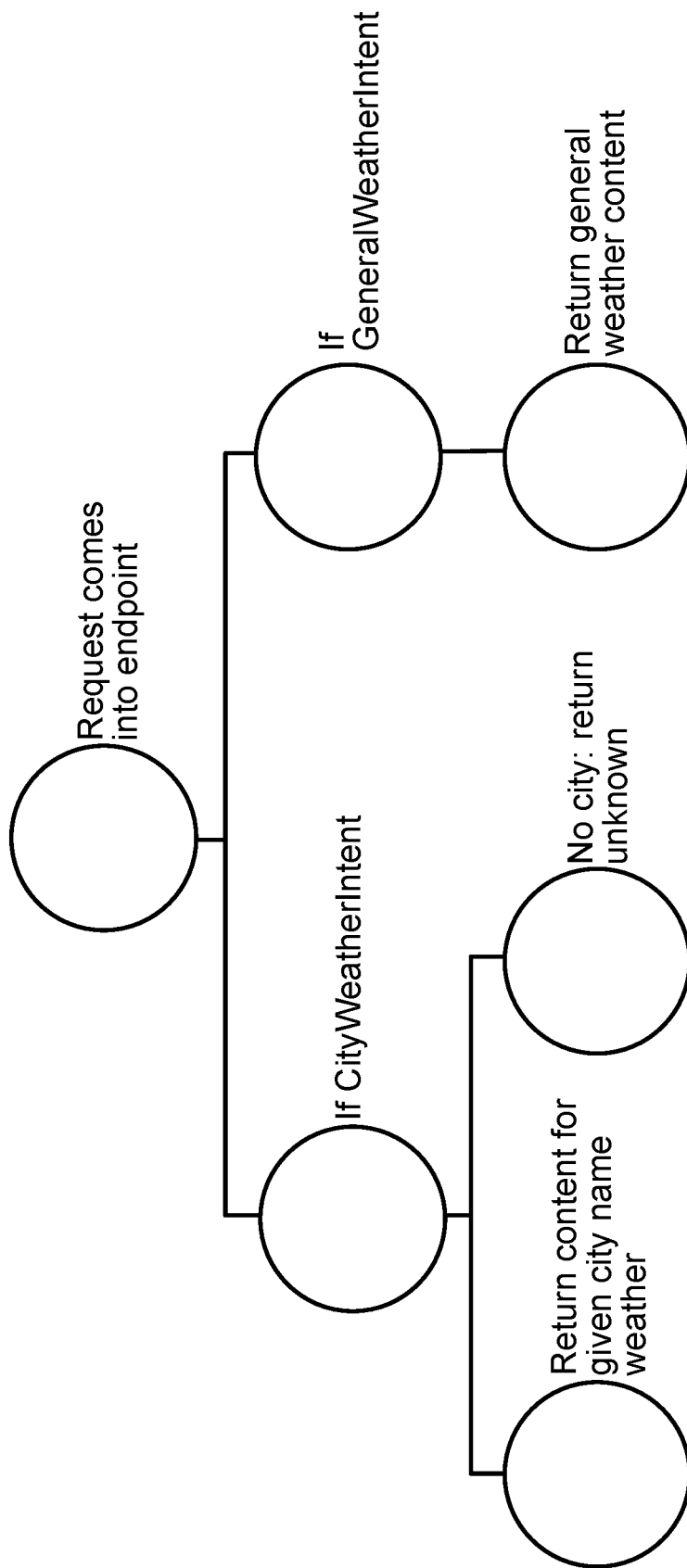

| | | | |
|---|---|---|---|
| 2004/0042593 A1 | 3/2004 | Gulrajani et al. | |
| 2004/0194016 A1 | 9/2004 | Liggit | |
| 2004/0205731 A1 | 10/2004 | Junkerman | |
| 2005/0049865 A1 | 3/2005 | Yaxin et al. | |
| 2007/0106934 A1 | 5/2007 | Muschett et al. | |
| 2007/0130337 A1 | 6/2007 | Arnison | |
| 2012/0271631 A1 | 10/2012 | Weng et al. | |
| 2012/0272221 A1 | 10/2012 | Pessoa et al. | |
| 2013/0006623 A1 | 1/2013 | Chelba et al. | |
| 2013/0268260 A1* | 10/2013 | Lundberg | G06F 17/28 704/8 |
| 2014/0229185 A1* | 8/2014 | Byrne | G10L 15/063 704/275 |
| 2014/0337814 A1* | 11/2014 | Kalns | G06F 8/00 717/100 |
| 2015/0100943 A1* | 4/2015 | Gabel | G06Q 30/02 717/106 |
| 2015/0371633 A1 | 12/2015 | Chelba | |
| 2017/0048170 A1 | 2/2017 | Smullen et al. | |
| 2017/0212884 A1 | 7/2017 | Kim et al. | |
| 2018/0039477 A1* | 2/2018 | Sung | G10L 15/1815 |
| 2018/0040324 A1 | 2/2018 | Wilberding | |
| 2018/0129484 A1* | 5/2018 | Kannan | G06F 3/0482 |
| 2018/0212904 A1 | 7/2018 | Smullen et al. | |
| 2018/0301150 A1 | 10/2018 | Woo et al. | |
| 2018/0330721 A1 | 11/2018 | Thomson et al. | |
| 2018/0366114 A1* | 12/2018 | Anbazhagan | G06F 9/451 |
| 2019/0147348 A1* | 5/2019 | Ng | G06F 9/453 706/46 |
| 2019/0188056 A1* | 6/2019 | Dimascio | G10L 15/22 |
| 2019/0258941 A1* | 8/2019 | Ng | G06F 9/453 |
| 2019/0267001 A1 | 8/2019 | Byun et al. | |
| 2019/0295537 A1* | 9/2019 | Sapugay | G06N 3/006 |
| 2019/0302970 A1 | 10/2019 | Kim et al. | |
| 2019/0341039 A1 | 11/2019 | Bharadwaj | |
| 2020/0320988 A1* | 10/2020 | Rastogi | G10L 15/18 |
| 2021/0056951 A1 | 2/2021 | McMahon et al. | |
| 2021/0056959 A1 | 2/2021 | McMahon et al. | |
| 2021/0065702 A1* | 3/2021 | Fink | G10L 15/22 |
| 2021/0082420 A1* | 3/2021 | Kraljic | G10L 13/02 |

OTHER PUBLICATIONS

Speechmarkdown.org [online], "Simple. Progressive. Cross Platform.", Published on or before Aug. 19, 2019, [retrieved on Aug. 26, 2019], retrieved from URL <https://www.speechmarkdown.org/> 5 pages.

Speechmarkdown.org [online], "What Is Speech Markdown?", Published on or before Aug. 19, 2019, [retrieved on Aug. 26, 2019], retrieved from URL <https://www.speechmarkdown.org/basics/what/> 3 pages.

Techcrunch.com [online], "Amazon develops a new way to help Alexa answer complex questions", Jul. 31, 2019 [retrieved on Aug. 26, 2019], retrieved from URL <https://techcrunch.com/2019/07/31/amazon-develops-a-new-way-to-help-alexa-answer-complex-questions/> 6 pages.

USPTO Transaction History for U.S. Appl. No. 16/544,375, filed Aug. 26, 2019.

USPTO Transaction History for U.S. Appl. No. 16/544,508, filed Aug. 26, 2019.

USPTO Transaction History for U.S. Appl. No. 16/544,527, filed Aug. 26, 2019.

U.S. Appl. No. 16/544,375, filed Aug. 19, 2019—pending.

U.S. Appl. No. 16/544,508, filed Aug. 19, 2019—pending.

U.S. Appl. No. 16/544,527, filed Aug. 19, 2019—pending.

U.S. Appl. No. 16/544,375, filed Aug. 19, 2019—pending, Submitted on Aug. 26, 2019, Submitted on Aug. 26, 2019.

U.S. Appl. No. 16/544,508, filed Aug. 19, 2019—pending, Olujimi A. Adesanya Gau: 2658, Submitted on Aug. 26, 2019, Submitted on Aug. 26, 2019.

U.S. Appl. No. 16/544,527, filed Aug. 19, 2019—pending, D. Abebe Gau: 2657, Submitted on Aug. 26, 2019, Submitted on Aug. 26, 2019.

U.S. Appl. No. 16/544,375, filed Aug. 19, 2019—pending, Submitted on Aug. 10, 2020, Submitted on Aug. 10, 2020.

U.S. Appl. No. 16/544,508, filed Aug. 19, 2019—issued, Olujimi A. Adesanya Gau: 2658, Submitted on Aug. 10, 2020, Submitted on Aug. 10, 2020.

U.S. Appl. No. 16/989,807, filed Aug. 10, 2020—pending, Submitted on Aug. 10, 2020, Submitted on Aug. 10, 2020.

U.S. Appl. No. 16/544,527, filed Aug. 19, 2019—issued, D. Abebe Gau: 2657, Submitted on Aug. 10, 2020, Submitted on Aug. 10, 2020.

U.S. Appl. No. 16/816,535, filed Mar. 12, 2020—pending, Submitted on Aug. 10, 2020, Submitted on Aug. 10, 2020.

PCT International Search Report and Written Opinion in International Appln. No. PCT/US2020/46201, dated Dec. 29, 2020, 11 pages.

International Preliminary Report on Patentability in International Application No. PCT/US2020/046201, dated Mar. 3, 2022, 8 pages.

* cited by examiner

DEVELOPMENT OF VOICE AND OTHER INTERACTION APPLICATIONS

This description relates to development of voice and other interaction applications.

A typical interactive voice application or chat application, for example, processes spoken or written requests (or simply "requests") received from an end user through an assistant platform or bot platform such as Amazon Alexa or Google Assistant. (We sometimes use the word "assistant" in place of "assistant or bot".) The assistant processes each request to determine the end user's intent. The interaction application then uses the intent to generate a response to be spoken or displayed back to the end user or both. The work of the interaction application is implemented using an interaction model, endpoint business logic, and content used for the responses.

Interaction Model

The interaction model is an object that helps the assistant platform to determine the intent of a request from an end user. Often the interaction model is in the form of JSON data including intents, slots, and sample utterances. Sample utterances are text expressions of utterances that the interaction model expects to encounter in end user requests. Slots contain parameter values associated with requests and responses. Intents are the intentions of end users that correspond to their requests.

Endpoint Business Logic

The endpoint of an interaction application is the component that receives information about end user intents from the assistant platform and sends text information to the assistant platform about items of content to be used in responses. The information about a user request includes the name of the intent that a natural language processor of the assistant platform matched to utterance of the request and the values of any slots that were assigned by the assistant platform in the process of matching a received utterance from an end user with sample utterances of the interaction model. The endpoint business logic generally represents and implements what the enterprise wants to provide as responses to received intents. The endpoint business logic is usually implemented as a RESTful HTTP API or a serverless function. The main functions of the endpoint business logic are to execute processes that use the interaction model, the intents, and slot information to find appropriate items of content and execute business logic to use for responses to requests.

Content for Responses

The content for the response that the endpoint business logic returns to the assistant platform and that is eventually spoken or displayed to the end user can be in the form of text derived from a speech-to-text process or media files or both.

The interaction model helps to identify the meanings of text phrases (spoken or written) derived from end user requests and maps the meanings to intents according to the protocols that govern one or more assistant platforms. Assistant platforms such as Amazon Alexa and Google Assistant, for example, use interaction models to provide abstract representations for mapping of spoken or written human words or phrases (which we together sometimes call simply "utterances") to specific functions (i.e., intents). An interaction model (typically in the form of JSON data) can comprise a hierarchical structure of intents→utterances→slots.

An intent represents a function that is bound to one or more utterances. An utterance may contain one or more slots to represent dynamic values (for example, a time of day). When an intent is indicated by interaction of an end user with an interaction assistant (e.g., an Amazon Echo Dot), information about the interaction (including the identified intent) is delivered by the assistant platform to the endpoint for additional processing. An endpoint is essentially an application having a collection of functions or methods that map to the intents defined within the interaction model. The endpoint's functions may contain references to items of content or literal content (we sometimes refer to the "items of content" and "literal content" simply as "content") that becomes part of the responses sent back to the assistant platform.

An interaction application is expected to implement interactions that are conversational from the end user's perspective. The developer's role is to impart to the interaction application information to enable it to correctly interpret intents and return appropriate items of content for responses to them. Typically a conversational interaction application is developed using the components described above and either a custom development process or a flow designer process (also known as a skill builder; we sometimes use the word "skill" interchangeably with "interaction application" or "app"). Both of these two approaches are based on literal (one might say "hard wired") connections between intents and utterances.

The Custom Development Process

In typical development of a custom conversational interaction application or app, the developer creates everything from scratch and manually develops the interaction model, endpoint business logic, and content. The typical development process includes the following sequence of steps:

1. Decide the interactions (requests and responses) the app should support.
2. Generate a unique intent for each interaction (request or response) of the app that can happen in a conversation with the end user.
3. Manually enter sample utterances expected for each intent. A sample utterance can be a word or phrase that the end user speaks or writes (an utterance) to express an intent. The developer tries to enter a comprehensive set of all of the sample utterances that an end user might be expected to say or write to express a given intent.
4. Compile all the intents and their corresponding sample utterances into an interaction model, directly mapping each sample utterance to its exact intent.
5. Create endpoint business logic that can receive from the interaction model an intent corresponding to an end user request based on matching the utterances of the request to the sample utterances of the intents created and compiled previously.
6. Provide a process for returning stored content that is the exact match for the given intent.

For example, if the developer is building an app to enable an end user to ask for the weather, the interaction model structure might be (the word "samples" refers to sample utterances; words in brackets are slots that can have specific values depending on the request):

Intent: {
name: "WelcomeIntent",
samples: ["open weather app", "talk to weather app"]
}
Intent: {
name: "GeneralWeatherIntent",
samples: ["what is the weather?", "how is it outside", "how is the weather today?"]
}

-continued

```
Intent: {
name: "CityWeatherIntent",
samples: ["what is the weather in {City}?", "how is it outside in {City}",
"how is the {City} weather today?"]
}
Intent: {
name: "LatestNewsIntent",
samples: ["what is new?", "what is the latest?", "anything new?"]
}
```

For such an app, the endpoint business logic could be expressed as:

```
if(request.name == "WelcomeIntent") return "Welcome to the weather app, ask about the weather."
if(request.name == "GeneralWeatherIntent") return ...
if(request.name == "CityWeatherIntent") return ...
```

The data flow at run time for the business logic endpoint would then be as shown in FIG. 1.

Custom app development can require that:
1. Each app have its own specific interaction model and endpoint business logic.
2. All parts of the app be manually coded.
3. The interaction model be created manually.
4. The interaction model be redeployment or recertified if a new intent or sample utterance is added to the interaction model.
5. A detailed utterance have an exact match to a sample utterance to respond to a request.
6. There be a large number of hand entered sample utterances per intent.
7. Slots that are specific and contextual.

The Flow Designer Development Process

The app that is the end result of the flow design development process is similar to an app that results from the custom application development process described above. Among the differences are that the flow design process provides tools that help to automate the creation of the interaction model and the simple endpoint business logic.

The typical process is:
1. Add nodes to a graphical user interface canvas presented to a developer.
2. Each node represents a specific intent that is added to the interaction model.
3. For each node an administrative user (e.g., someone who is not technically trained) can add sample utterances and give the node a name.
4. Add content and attach the content to the node as the response.
5. Connect the nodes on the canvas to extend the endpoint business logic for continuing a conversation.
6. Store the created node structure in a database.

The resulting interaction model would look just like the one developed using the custom process.

At run time, the execution of the business logic of the app when an intent is received is to:
1. Search the database of nodes for the one that matches the intent associated with the request.
2. Find the content that is attached to that node and return that content as the response to the request.

Flow design development can require:
1. Recertification and redeployment of the app after each change to the flow due to the modification of intents and utterances.
2. Utterances to match sample utterances exactly for a node in the canvas.
3. The entire conversational app to be designed before deployment.
4. Extra effort to manage apps that are designed to handle, say, more than 20 intents.
5. Slots to be specific and contextual.

The flow design development process can potentially support multiple platforms and doesn't require custom coding of endpoint business logic.

SUMMARY

In general, in an aspect, a developer of an interaction application for an enterprise can create items of content to be provided to an assistant platform for use in responses to requests of end-users. The developer can deploy the interaction application using defined items of content and an available general interaction model including intents and sample utterances having slots. The developer can deploy the interaction application without requiring the developer to formulate any of the intents, sample utterances, or slots of the general interaction model.

Implementations may include one or a combination of two or more of the following features. The enabling of the developer to create items of content includes presenting a graphical user interface enabling the developer to create the items of content without requiring the developer to engage in coding. The intents of the general interaction model include abstract intents that cannot be mapped directly to specific content without parsing and interpretation of slots associated with corresponding sample utterances. The sample utterances include abstract characterizations of requests that cannot be mapped directly to specific content without parsing and interpretation slots of the sample utterances. One or more of the slots includes an open-ended slot that requires parsing and interpretation in order to determine an appropriate item of content corresponding to an utterance of an end user. The interaction application is for an enterprise that belongs to a particular vertical market and the developer can select a template configured for developing interaction applications for enterprises belonging to the particular vertical market. The developer can indicate one or more particular sample utterances of an end user for each intent. The developer can customize the general interaction model by adding an intent or a sample utterance pattern. The developer can deploy the interaction application for use with two or more different assistant platforms without requiring any action by the developer to configure the interaction application for use with each of the two or more different assistant platforms.

In general, in an aspect, a memory stores instructions executable by a processor to receive utterances including slots, the utterances having been derived by an assistant platform from requests of end-users of interaction assistants. Each of the received utterance is applied to a general interaction model to determine intents. The general interaction model includes non-specific sample utterances including open-ended slots. The intents are forwarded to an interaction application configured to find items of content for use in providing responses to the requests of the end users.

Implementations may include one or a combination of two or more of the following features. The apparatus of claim in which the non-specific sample utterances cannot be used directly to find items of content without parsing and interpreting the open-ended slots. The apparatus of claim in which the open-ended slots include extended portions of utterances of end-users including parameters having values and text elements representing context to be parsed and interpreted. The apparatus of claim in which the intents include non-specific intents.

In general in an aspect, markup elements of the speech markup language string are expressed as a tree of nodes. Each of the nodes corresponds to one of the markup elements of the string. The tree of nodes is segmented into branches. The branches have the same first node. The branches are processed. The speech markup language string his re-expressed based on results of the processing of the branches. The speech markup language string is re-expressed for use in responding to requests of end-users of interaction assistants.

Implementations may include one or a combination of two or more of the following features. The speech markup language string is expressed in accordance with SSML. The markup elements include tags of a speech markup language. The segmenting of the tree of nodes into branches includes identifying branches that may not be usable by an interaction assistant platform that applies a version of a speech markup language according to which the speech markup language string is expressed. The branches may not be usable because they contain nodes that are invalid elements of the version of the speech markup language applied by the interaction assistant platform. The invalid elements include invalid types of elements. The invalid elements include elements having invalid properties. The invalid elements include elements having invalid values of properties. The invalid elements include invalid types of children nodes. The re-expressing of the speech markup language string based on results of the processing of the branches includes removing invalid nodes of branches and merging the branches including the branches from which the invalid nodes it been removed. The re-expressed speech markup language string is provided to an interaction assistant platform for use in a text to speech presentation of a response to an end user.

In general, in an aspect, rules are stored representing a particular version of a speech markup language definition applied by an interaction assistant platform. The rules representing the particular version are applied to validate a speech markup language string to be used in responses to requests of end-users of interaction assistants conforming to the particular version.

Implementations may include one or a combination of two or more of the following features. Rules are stored representing a second particular version of the speech markup language definition applied by a second interaction assistant platform. The rules representing the second particular version are applied to validate a speech markup language string to be used in responses to request of end-users of interaction assistants conforming to the second particular version. The speech markup language definition includes SSML. The validated speech markup language string is provided to the interaction assistant platform for use in presenting responses to requests of end-users. The application of the rules to validate the speech markup language string includes expressing markup elements of a speech markup language string as a tree of nodes. The application of the rules to validate the speech markup language string includes identifying elements of the string having invalid properties. The application of the rules to validate the speech markup language string includes identifying elements of the string having invalid values of properties. The application of the rules to validate the speech markup language string includes identifying elements of the string having invalid types of children nodes.

In general, in an aspect, the user interface is presented enabling a developer to create speech markup language strings conforming to a speech markup language definition applied by a corresponding interaction assistant platform. The user interface enables the user to create markup language strings using plain text and graphical elements and without requiring the user to select or enter any formal expressions of markup elements of the speech markup language definition.

Implementations may include one or a combination of two or more of the following features. The user interface presents controls for entering text to be spoken to an end user by an interaction assistant. The user interface presents controls corresponding to elements of the speech markup language strings associated with effects to be applied or added to one or more words of text to be spoken to an end user by an interaction assistant. The user interface presents controls corresponding to properties of elements of the speech markup language strings. The user interface presents controls corresponding to selectable values of properties of elements of the speech markup language strings. The user interface presents controls including icons graphically representative of effects to be applied to one or more words of text to be spoken to an end user by an interaction assistant, properties of the effects, or values of properties of the effects. The user interface displays graphical indicators in line with text words, the graphical indicators representing effects to be applied to one or more of the text words when the words are spoken to an end user by an interaction assistant. The graphical indicators include graphical icons indicative of the nature of the effects. The graphical indicators include graphical elements identifying values of properties of effects. The graphical indicators include backgrounds displayed with the words to which the corresponding effects are to be applied. The backgrounds are color-coded according to the effects to which they correspond. The effects to be applied to one or more words can be nested and the backgrounds are nested in accordance with the nesting of the effects. The user interface displays controls enabling a developer to select a display of the raw speech markup language strings or a display of the text and graphical indicators representative of the effects to be applied to the text in line.

In general, in an aspect, a representation of the speech markup language string is displayed to a user of a user interface, including plain text and graphical indicators of markup language elements. Each of the graphical indicators it is displayed in graphical association with a portion of the speech markup language string to which the corresponding one of the markup language elements applies.

Implementations may include one or a combination of two or more of the following features. The graphical indicators are displayed in line with the plain text. The graphical indicators represent audio effects to be applied to one or more words of the plain text. The graphical indicators represent properties of audio effects to be applied to one or more words of the plain text. The graphical indicators include backgrounds displayed with words of the plain text to which the corresponding effects are to be applied. The backgrounds are color-coded according to the effects to which they correspond. The effects to be applied to one or more words of the plain text can be nested and the backgrounds are nested in accordance with the nesting of the effects. The user interface displays controls enabling a developer to display of the raw speech markup language strings and to display the plain text and graphical indicators representative of the effects to be applied to the text in line.

In general, in an aspect, content is stored that is configured to be used by two different interaction applications in generating responses to requests from users of interaction assistants. The two different interaction applications our executed to respond to intents and slot information received from assistant platforms based on the requests from users of interaction assistants. The intents and slot information have been generated by application of a single general interaction model to the requests from the users.

Implementations may include one or a combination of two or more of the following features. The execution of the two different interaction applications invokes the respective stored content. The two different interaction applications are associated with a single enterprise. The two different interaction applications are associated with two different enterprises belonging to a single vertical market. The two different interaction applications are associated with two different enterprises belonging to two different vertical markets. At least one of the different interaction applications is executed to respond to intents and slot information received from two different assistant platforms. The single general interaction model includes non-specific intents. The single general interaction model includes open-ended slots. The stored content is updated without changing the single general interaction model.

In general, in an aspect, intents and slot information are received from an assistant platform based on requests of end-users of interaction assistants. The intents and slot information have been derived by natural language processing. Additional natural language processing his applied to the intents and slot information received from the assistant platform. Additional information about the requests of the end users is derived based on the additional natural language processing.

In general, in an aspect, utterances are received representing requests of end users of interaction assistants. The received utterances are compared with non-specific sample utterances of a general interaction model. A variety of received utterances are accepted as matches for a given non-specific sample utterance.

Implementations may include one or a combination of two or more of the following features. The slot information of the received utterances is processed to identify content to be used in responses to the requests. Each of the different items of content corresponds only to one of the received utterances of the variety of received utterances that are accepted as matches.

In general, in an aspect, a user interface enables a developer of an interaction application to select general utterance patterns for inclusion in the interaction application. Each of the general utterance patterns spans a set of one or more sample utterances that correspond to the general utterance pattern. The user interface exposes a set of available general utterance patterns. Machine learning techniques are automatically applied to stored sample utterances, stored general utterance patterns, or sample utterances proposed by developers of interaction applications, to identify additional general utterance patterns. The additional general utterance patterns in the set of available general utterance pattern our exposed by the user interface.

Implementations may include one or a combination of two or more of the following features. Proposed sample utterances of developers our matched with stored sample utterances or stored general utterance patterns to identify the additional general utterance patterns. The interaction application is being developed for an enterprise of a particular industry, and at least some of the general utterance patterns are available to developers of interaction applications for another industry. In response to the developer proposing a sample utterance for interaction application, automatic suggestion is made to include a particular general utterance pattern in the interaction application. Additional general utterance patterns are identified for inclusion in the set based on similar sample utterances proposed by multiple developers of interaction applications for enterprises in the particular industry.

These and other aspects, features, implementations, and advantages (a) can be expressed as methods, apparatus, systems, components, program products, business methods, means or steps for performing functions, and in other ways, and (b) will become apparent from the following description and from the claims.

DESCRIPTION

Figure 2:
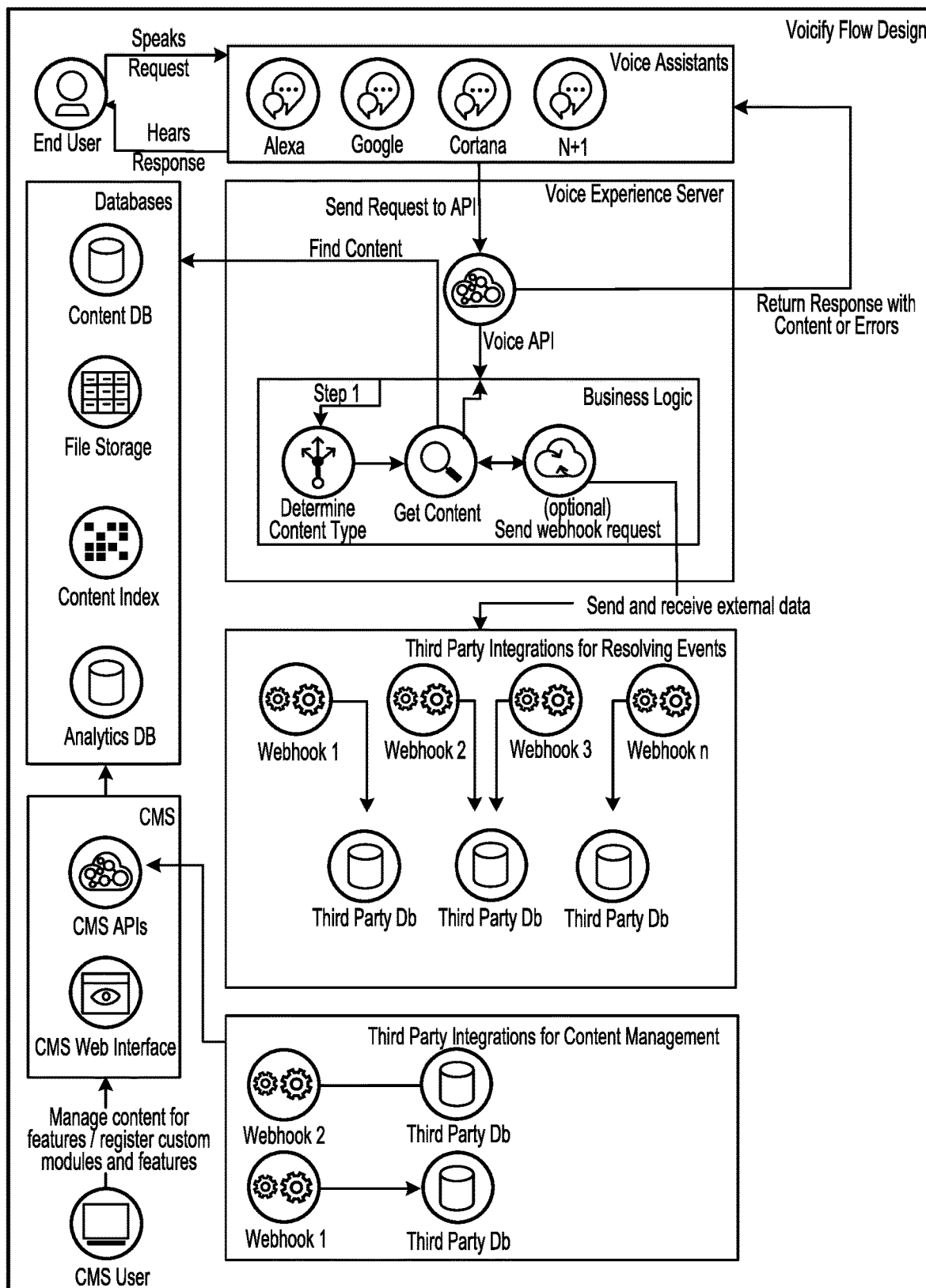
Figure 3:
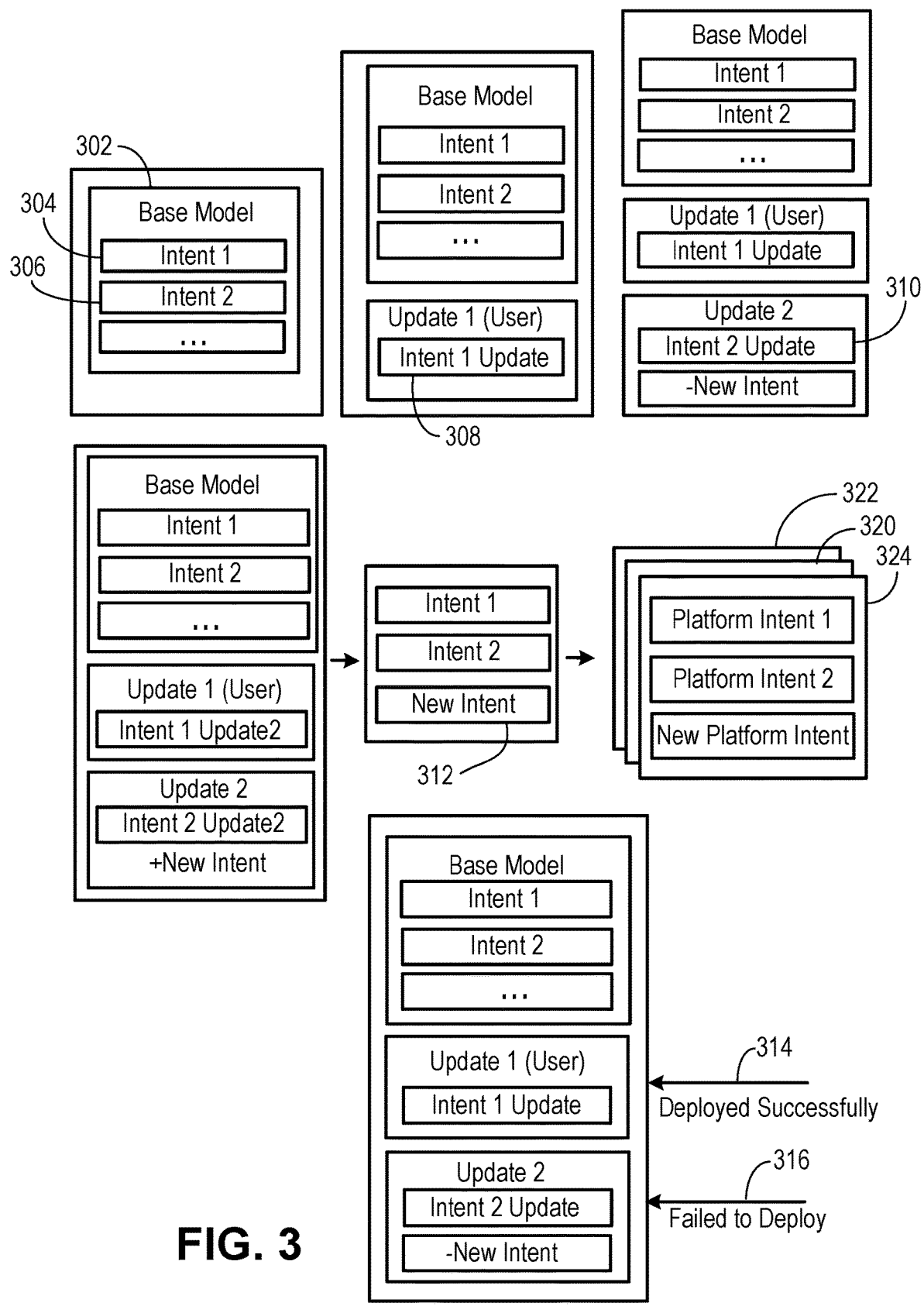
Figure 14:
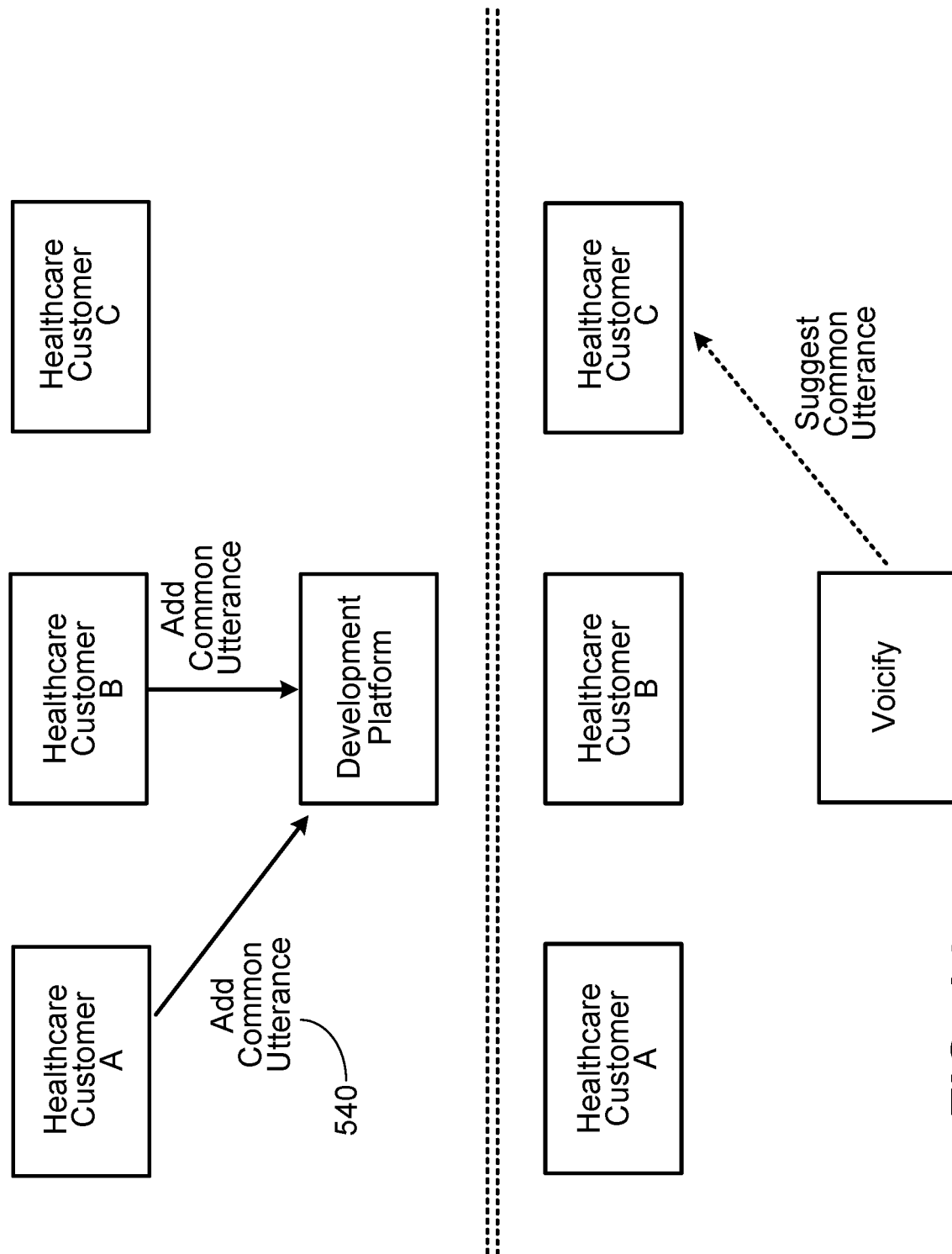
Figure 15:
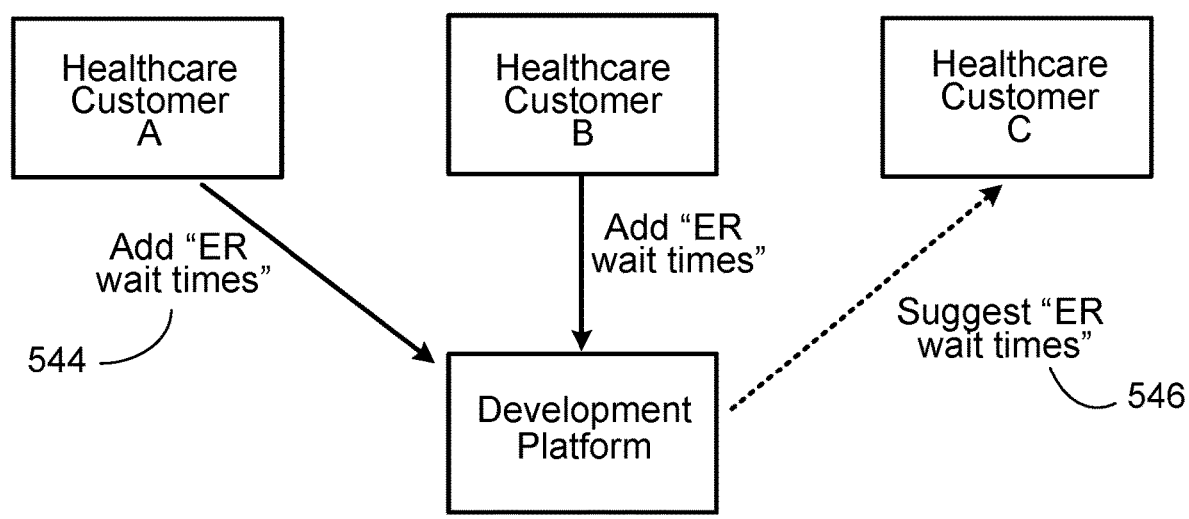
Figure 16:
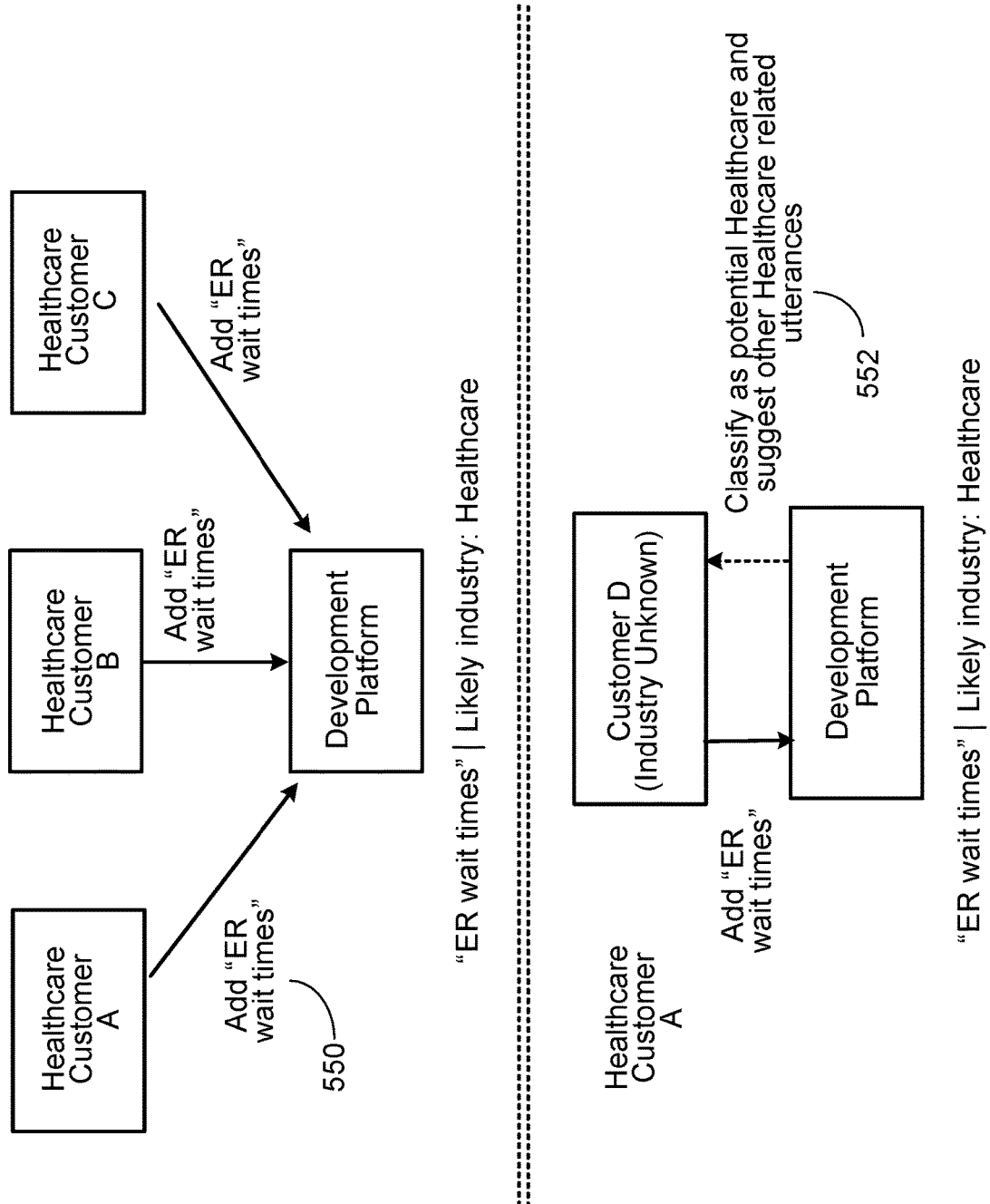

FIG. 1 is a flow diagram.
FIG. 2 is a block diagram.
FIG. 3 presents flow information.
FIGS. 4 through 8 are trees.
FIGS. 9 through 13 are screenshots.
FIGS. 14 through 16 are schematic diagrams.

Here we describe an improved interaction application development platform and process, which we sometimes call simply the "development platform". The development platform has a variety of features that make development of interaction applications fast, easy, adaptable, scalable, and convenient, among other advantages.

Content-First

One feature of the development platform is its use of a "content-first" (or content-centric) development approach. The content-first development approach gives priority to the aspects of the app development and deployment process that involve development of content and management of relationships between end-user requests and responses.

General Interaction Model

Another aspect of the development platform is that, instead of requiring a developer or administrator to manually create an entire interaction model (directly or indirectly), the development platform provides a pre-populated general interaction model that can handle almost any end user request without input from the developer or administrator. As described later, the development platform can be customized by the user to handle any unusual requests. The general interaction model is abstract and globally applicable to a wide variety of existing and future assistant platforms, a wide variety of enterprises within a given vertical market, and in a wide variety of vertical markets.

As an example, the following hard-coded interaction model can support only two user requests: Welcome and Weather.

```
Intent: {
name: "WelcomeIntent",
samples: ["open weather app", "talk to weather app"]
}
Intent: {
name: "GeneralWeatherIntent",
samples: ["what is the weather?", "how is it outside", "how is the weather today?"]
}
```

-continued

```
Intent: {
name: "WelcomeIntent",
samples: ["open weather app", "talk to weather app"]
}
```

The development platform's general interaction model, by contrast, can manage Welcome, Weather, and several other user requests due to the abstract nature.

```
    Intent: {
    name: "VoicifyGeneralQuestionIntent",
    samples: ["what is the {Query}?", "how is {Query}"]
    }
```

To demonstrate, the abstract utterance pattern of "what is the {Query}" can handle user requests that follow the abstract utterance pattern where the {Query} value can be dynamically determined.

Graph Traversal and Content Index Searching

Another aspect of the development platform is that the way the general interaction model determines where to search for content for use in a response to a request is based on graph traversal followed by content index searching. Certain features of such graph traversal and content index searching are described in more detail in U.S. patent applications Ser. Nos. 16/000,805, 16/000,799, 16/000,789, 16/000,798, and all filed on Jun. 5, 2018, and issued U.S. Pat. No. 10,235,999, which are incorporated here by reference in their entirety.

Question and Answer Development Example

It is common for interaction applications to define a collection of questions and answers to reply to end-user requests (questions) by appropriate responses (answers). It is like a collection of frequently asked questions (i.e., FAQ's) within a website only handled by voiced answers to voiced questions. In typical cases for which the requests are expected to be questions and the responses will be answers to the questions, the basic process of creating a specific interaction model for an app using the development platform is simple and includes three steps:
1. Invoke a template type appropriate for the specific interaction model. For example, the template for a question and answer represents an object that consists of a collection of sample utterance phrases corresponding to the question and a content response corresponding to the answer.
2. Enter and store items of content for the template type. Using the example above, a user would enter content that represents the response (answer) to the question.
2. Enter and store a few ways someone can ask a question (sample utterances).

Using the entered content and questions and information contained in the template, the development platform has enough information to automatically process and generate a response to essentially any type of request an end user might pose and handle variations of utterances that don't require exact matching. For example, end-user requests that use the general utterance pattern "how do I {Query}?" will map to a single intent within the development platform's general interaction model. The development platform uses the value of {Query} to search for a content match that will provide a suitable answer to both the general "how do I" part of the request and the specific {Query} part of the request. Because {Query} can have a wide range of specific values representing a variety of implicit intents, the use of the general utterance pattern support a wide range of requests. In some implementations, this simple process is possible because the general interaction model of the development platform includes relatively fewer different intents (utterance patterns) than would be used for the specific interaction model in custom development or flow designer development, and the general interaction model uses open-ended slots as explained below. Said another way, the general utterance pattern represents a range of possible specific intents all falling within the notion of a generalized intent, and the {Query} value can be used in the course of the processing of the interaction model to disambiguate exactly which specific intent within the generalized intent was meant by the end user's request.

Open-Ended Slots

The general interaction model uses open-ended slots that can be fulfilled by full sentences rather than small phrases or individual words. For example, a sample utterance and its open-ended slot might be represented as: "I want to {Query}" in which the word Query represents the open-ended slot. This generalized sample utterance yields an intent match for a variety of requests but not limited to "I want to buy a computer", "I want to learn about fishing", "I want to know what the weather is". The requests represent vastly different intents of the end user but are represented by a single sample utterance pattern.

Slots that are more open-ended are possible because, at run time, the interaction application can use its data flow including graph traversal and content search to match each request to the proper content to be used in the response. And because the values for the slots that are in the request contain full sentences and phrases, the interaction application can do additional secondary natural language processing, such as keyword extraction and variable extraction. (for example, the interaction application will search for the phrase "buy a computer" based on the request "I want to buy a computer") even after the assistant platform has done its primary natural language processing on the request before the request is received by the endpoint from the assistant platform.

Because the general interaction model is simplified using fewer, but pattern-based open-ended (e.g., abstract or general) intents and sample utterances, the development platform can use the same general interaction model for many different interaction applications (being developed for example, across competitors in a vertical market and across different vertical markets). Each of the interaction applications can also include enhancements to the general interaction model if necessary without affecting the underlying generic interaction model.

We use the term "open-ended" (with reference to, e.g., slots, intents, and utterance patterns) broadly in the sense, for example, element to which it refers is abstract, generalized, spans potentially multiple varied instances, universal, or otherwise generic.

Example General Interaction Model

An example (very simplified) general interaction model for an app (interaction application) developed using the development platform app is:

```
{
    "interactionModel": {
        "languageModel": {
            "invocationName": "voicify labs",
            "intents": [
                {
                    "name": "AMAZON.FallbackIntent",
                    "samples": [ ]
                },
                {
                    "name": "AMAZON.CancelIntent",
                    "samples": [
                        "I'm all set"
                    ]
                },
                {
                    "name": "AMAZON.HelpIntent",
                    "samples": [ ]
                },
                {
                    "name": "AMAZON.StopIntent",
                    "samples": [
                        "Quit",
                        "Goodbye"
                    ]
                },
                {
                    "name": " VoicifyGeneralQuestionIntent",
                    "slots": [
                        {
                            "name": "Query",
                            "type": "AMAZON.SearchQuery"
                        }
                    ],
                    "samples": [
                        "Show me {Query}",
                        "Do you have {Query}",
                        "Give me a {Query}",
                        "Give me an {Query}",
                        "Tell me {Query}",
                        "Are there {Query}",
                        "Do I {Query}",
                        "How does {Query}",
                        "Where did {Query}",
                        "What were {Query}",
                        "Help me {Query}",
                        "Is there {Query}",
                        "Where's {Query}",
                        "Where is {Query}",
                        "For a {Query}",
                        "Can I {Query}",
                        "I {Query}",
                        "I am {Query}",
                        "I would {Query}",
                        "I want {Query}",
                        "How can I {Query}",
                        "Who are {Query}",
                        "What are {Query}",
                        "Tell me about {Query}",
                        "What is {Query}",
                        "What's {Query}",
                        "How did I {Query}",
                        "How to {Query}",
                        "How should {Query}",
                        "What does {Query}",
                        "What's on {Query}",
                        "What is on {Query}",
                        "Are there any tweets {Query}",
                        "Did anyone tweet {Query}",
                        "Give me the {Query}",
                        "Create a {Query"
                    ]
                }
            ]
        }
    }
}
```

The VoicifyGeneralQuestionIntent can be illustrated by the following sample:

```
Intent: {
  name: "VoicifyGeneralQuestionIntent",
  samples: ["What is{Query}", "How does {Query}", "....."]
}
```

Given this portion of the general interaction model, the end user's utterance of "What is the weather like in Boston today" when applied to the general interaction model would match the abstract first sample utterance (what is?) for the intent and would send to the endpoint the "general question intent" and include the phrase "the weather like in Boston today" in the {Query} slot. The intent is abstract and general in that it only entails an indication of an extremely broad class of question, such as What? or How? The general question intent is not specific in any other respect.

By contrast, for a specific interaction model generated in a custom app development process or using a flow designer development process, the endpoint would only receive the specific value "Boston" in the {City} slot of the request.

Naturally, in the context of a conversational interaction application involving questions and answers, the "general question intent", a well-phrased comprehensive set of sample utterances, and an appropriate graph of corresponding nodes to be traversed, should enable the endpoint business logic to handle essentially any incoming question initiated by an end user. The lengthy query slots of the sample utterances provide information enabling the endpoint to traverse the graph and find the content that is appropriate for any of a variety of possible slot values.

Because the endpoint of the development platform can receive more of the full phrase ("the weather like in Boston today" versus "Boston"), the endpoint can apply processes to the fuller (and potentially more complicated or nuanced) phrase enabling it to understand the request more completely and effectively than if it received only an intent name and a city slot. These processes may include additional natural language understanding, key word extraction, sentiment analysis, content search, and analytics processing. These types of additional processing generally are not possible without the availability of the longer phrase or expression.

The endpoint business logic for reaching the right content for a given request then follows the data flow discussed in the previously cited patent applications and patent and as shown in FIG. 2. This process involves the native assistant platform sending the request data to the endpoint of the interaction application which then goes through the following steps to determine the response to return:
1. Validation of the request received.
2. Graph traversal to determine the expected content area to search.
3. Content search against indexed content created by the content management system user.
4. Additional processing of the request and response such as $3^{rd}$ party webhook requests and analytics tracking.
5. Building the response to return to the native assistant platform.

General Interaction Model Editing

When an interaction application is created on the interaction platform, it is given a base interaction model with several intents formatted by the host of the interaction platform. Many applications will make use of this interaction model as is, and never need to update it While many developers will not necessarily need to update or enhance the development platform's general interaction model because its intents and sample utterances are abstract and it has broad applicability, more advanced applications may require additional control over the general interaction model. For these cases, the interaction platform enables users to change the development platform interaction model directly and allows the platform to translate changes to a specific interaction model automatically during deployment. This process is described in FIG. 3.

These updates and changes are not applied to change the base interaction model directly. Instead, updates and changes to the base interaction model as stored as sets of discrete changes. Each set of changes is timestamped to preserve the history and chronology of the changes.

As shown in FIG. 3, in a simple example, a base general interaction model 302 provided by the interaction platform can handle Intent 1 (304) and Intent 2 (306). As discussed earlier, each intent comprises a number of sample utterances that an end-user might say to indicate an intent to trigger a feature of an interaction assistant and will have between zero and many slots which allow specific data values to be extracted from an utterance.

A developer can enhance the base general interaction model by defining an update to an existing intent, such as the Intent 1 Update 308. Such an update could include editing an intent by adding or removing sample utterances. In some cases the host of the platform can update an intent of the base general interaction model such as the Intent 2 Update (310). In some instances, a developer can add a New Intent 312 to the base general interaction model.

In addition, the interaction platform can help the developer identify changes to the base general interaction model that are rejected by a particular assistant platform. The interaction platform tracks successes 314 and failures of deployments and so can trace issues more specifically to particular changes or updates instead of having to rely on information for successes and failures of a single entire interaction model. In the diagram, Update 1 did not prevent a successful deployment, but Update 2 caused the deployment to fail.

The interaction platform provides information to developers and enterprises about the history of changes and updates to particular interaction models This information offers a number of opportunities for improving management of interaction models and their development and deployment.

For example, a developer may apply updates and find that the performance of the application has been affected negatively. Because the interaction platform maintains a history of the structure and elements of the interaction platform at each successive deployment, the developer easily can undo the most recent interaction model update and redeploy the previously deployed version.

When an interaction model is to be deployed to a particular assistant platform, it is first flattened into a deployment interaction model by applying all of the previously defined changes and updates. From there, it's converted to specific interactive models 320, 322, 324 that conform to the requirements of respective assistant platforms and deployed.

In some implementations, the interaction platform may determine (for example, through automated inspection of repeated developer updates) that particular intents are worth updating for all interaction models for all interaction applications. In these cases, administrative updates can be made automatically (or with human assistance) across all interaction models to add, remove, or edit one or more intents.

SSML (Speech Synthesis Markup Language) Processing and Managing

Assistant platforms such as Amazon Alexa and Google Assistant can respond to end-user commands or statements (i.e., requests) by presenting audible readouts of text. The audible readouts are audio files generated by the assistant platform based on text provided by the interaction application developer in the content items of the interaction application. The audible readouts (generated audio files) leverage computer generated voices hosted by the assistant platform that are designed to sound like a human. While the voices are meant to sound human-like, the voice assistant typically recites the text provided in the response from the endpoint at a consistent pace and exhibiting little intonation or varied emphasis on words.

To provide more human-like qualities to the readout of text, assistant platforms support a mark-up language called Speech Synthesis Markup Language (SSML). SSML allows an interaction application developer to specify effects to be applied to text that will be read out by the assistant platform. At its core, SSML is a programming markup language specification based on XML with implied node types that represent "plain-text". The markup language is used to tell a speech synthesis engine (hosted by the assistant platforms) how to create an output audio file from the text provided in the response from the endpoint. The SSML file is used to adjust elements of the speech such as:

Pronunciations of words
Effects to be applied to words or phrases, including
   Speed/Rate of speech
   Pitch
   Volume
   Emphasis
Pauses to be added
Mixing of audible speech with recorded audio clips
The full official W3C specification of SSML is available here: https://www.w3.org/TR/speech-synthesis11/.

There are some inherent challenges with SSML when applied to assistant platforms. Some of the challenges are based on loose adoption of SSML standards by assistant platforms. As an example, while Amazon Alexa and Google Assistant both support SSML, they do not support all SSML tags consistently, and in some cases, some tags are not supported at all.

Additionally, since SSML is an XML based programming language, it is applied using a hierarchical representation of tags. It borrows techniques similar to those used by HTML (Hyper-Text Markup Language) for screen-based output of web pages, but the mark-up of SSML is applied to audible output. While it is fairly easy to provide a graphical interface to enable an interaction application developer to apply SSML to text, it is challenging to create a graphical interface (for example, one suitable for non-technical users) that visually and intuitively represents how SSML tags will affect audible output.

The development platform that we describe here offers an effective way to manage the challenges referenced above. Among the features of the development platform are the following:

1. SSML is segmented and parsed into distinct parts for additional processing to support functionality such as text-to-speech.

2. SSML is validated using customizable rules and detailed errors. The results of the validation offers insight into compatibility across multiple assistant platforms (e.g., Google Assistant and Amazon Alexa).

3. SSML mark-up can be visually (graphically) edited without needing to know the structure, hierarchy, code, or rules about it.

SSML Processing

All three of these features and others are made possible by processing an SSML string into an object tree structure, applying custom logic to the tree structure, and processing the object tree structure back into an SSML string.

In the first step, the processor pre-processes the SSML string into formatted parts that can be parsed, then scans the segmented SSML string for XML nodes and plain text and forms them into a tree having many parent-child relationships. Each node in the tree has properties like the SSML element name, the attributes of the SSML element, and a reference to all its children.

For example, the following SSML string would be pre-processed and then turned into the subsequent tree structure represented in code.

Raw SSML String:

```
"<speak>This is my plain text <emphasis level=\"strong\">with some emphasis here</emphasis>. And an audio clip here <audio src=\"https://a-url.com/an-audio-file.mp3\"/><prosody speed=\"+50%\">with some effects and say-as <say-as interpret-as=\"digits\">123</say-as></speak>"
```

The preprocessing step then produces the following formatted pre-processing SSML:

```
<speak>
    This is my plain text <emphasis level="strong">with some emphasis here</emphasis>.
    And an audio clip here <audio
    src="https://a-url.com/an-audio-file.mp3"/>
    <prosody rate="+50%">
        with some effects and say-as
        <say-as interpret-as="digits">123</say-as>
    </prosody>
</speak>
```

Figure 4:
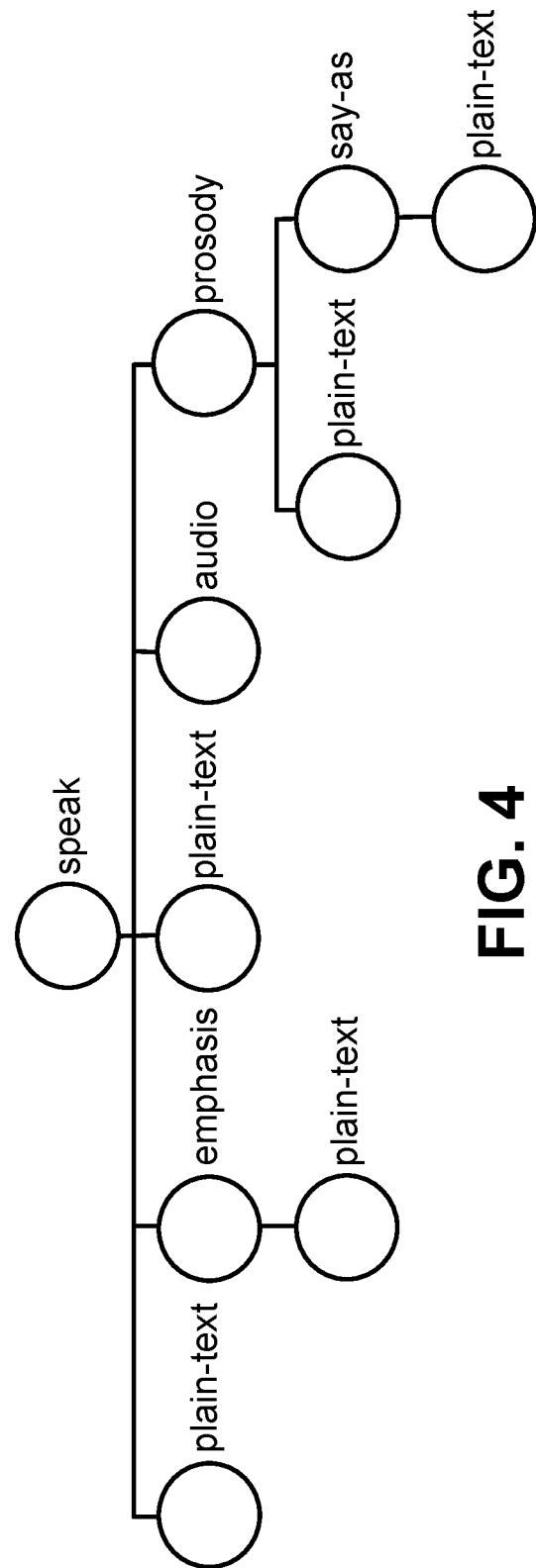

In the next step, the preprocessed and formatted SSML is parsed to produce the Processed SSML Data Structure shown in FIG. 4.

The structured tree of FIG. 4 can be processed to recover the original SSML string by generating the property XML elements and attributes based on the name and properties of the node as well as the following children of each node. Because recovering the original SSML string is straightforward, nodes can be added to the data structure and then be represented in the recovered SSML string that can be processed by the native assistant platforms or text-to-speech services. In other words, manipulations can be performed when the SSML string is expressed in the data structure and then returned to an SSML format typically expected by the assistant platforms or text-to-speech services.

Validation and Rule Engine

Using this tree structure, the development platform is able to validate the underlying SSML against a set of rules. Among other things, the rules can be customized to fit differences between how different platforms support different elements of SSML. For example, Alexa supports the <voice/> element while Google does not, and Google has a different min and max speed value for the <prosody/> element than does Alexa.

A set of rules or "rule book" can be generated for each assistant platform to which SSML strings of the development platform will be provided. A set of rules may have the following:

A list of SSML elements supported by that assistant platform

A subset of rules for each element
   Allowed properties of the element
   Allowed values of those properties
      Min/Max values
      Exact values
   Allowed units for those property values
   Allowed child element types
A maximum number of elements in the complete string The validation process traverses the tree beginning at the first node(s). The validation process validates each node by:

Checking that the element type is in a list of supported element types
   If it is not, the validation process will return an error stating that the specific element is not valid
Check each of the properties of the node against the allowed properties for that type of element
   If there is a property that is not allowed, the validation process will return an error stating the property that is not allowed on the specific element
Check the values of each of the properties of the node against the allowed values for that property
   If there is a value that does not fit the min/max or exact allowed values, the validation process will return an error stating the exact element, exact property, and the actual allowed values and why the given value did not fit
Check the unit of each property value against the allowed unit types of that property
   If there is a given unit that as a property value that is not valid, the validation process will return an error stating the given unit, property, and element that does not allow it
Check that the node's immediate children are among the child types allowed four the node
   If there are any children nodes that are not in the allowed child types, the validation process will return an error with the name of the child type that is not allowed for the specific node type.
Check each of the node's children against the same set of logic above until there are no elements of the tree left to check and all of the checked elements comply with the rules, at which point the tree is considered valid.

EXAMPLES

Valid Types:
A given rule book has the allowed elements of: speak, say-as, prosody, break, audio
The provided SSML string is: <speak>this is text <yell>this is more text</yell></speak>
The validation process will return an error saying: "yell is not a supported SSML element".
Valid Properties:
A given rule book has the allowed type of: prosody
Which has the allowed properties of: rate, pitch, volume
The provided SSML string is: <speak>this is text <prosody emphasis="loud">this is more text</prosody></speak>

The validation process will return an error saying: "emphasis is not a supported property of the prosody type"

Valid Property Values:

A given rule book has the allowed type of: prosody

Which has the allowed property of: rate

With the allowed values of: >−50% and <+200%

The provided SSML string is <speak><prosody rate="−80%">this is slow</prosody></speak>

The validation will return an error saying: "−80% is below the minimum value of −50% for the rate property of prosody"

Valid Property Units

A given rule book has the allowed type of: prosody

Which has the allowed property of: rate

With the allowed unit of: %

The provided SSML string is <speak><prosody rate="+100 dB">this is loud</prosody></speak>

The validation will return an error saying: "dB is not a valid unit for the rate property of prosody, the only allowed unit is %"

Valid Child Types:

A given rule book has the allowed type of: say-as

Which has the allowed child types of: plain-text

The provided SSML string is <speak><say-as interpret-as="address">33 Arch Street, <emphasis level="strong">Boston</emphasis>, MA</say-as ></speak>

The validation will return an error saying: "say-as does not allow the emphasis element"

SSML Segmentation

Because certain voice assistants and text-to-speech tools support different SSML elements, and sometimes different properties for corresponding supported elements, the development platform can adjust incompatible SSML for one assistant platform so that it is supported, by segmenting disallowed parts of the tree.

The segmentation process involves selecting an SSML element type that is not allowed and removing it from the tree without disturbing that element's children. It is important not to affect the children in order to maintain any other allowed "parent" effects that are applied to the children. The segmentation process leaves the original tree broken into multiple trees depending on the number of places it needs to perform segmentation.

For example, Alexa supports the <voice> tag that Google does not support. So, if desired, the development platform can segment SSML elements that use the <voice> for compatibility with Google and remove those elements while keeping other effects.

Figure 5:
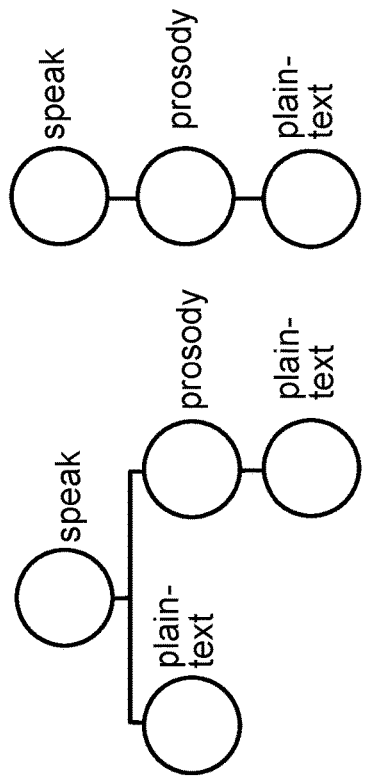
Figure 7:
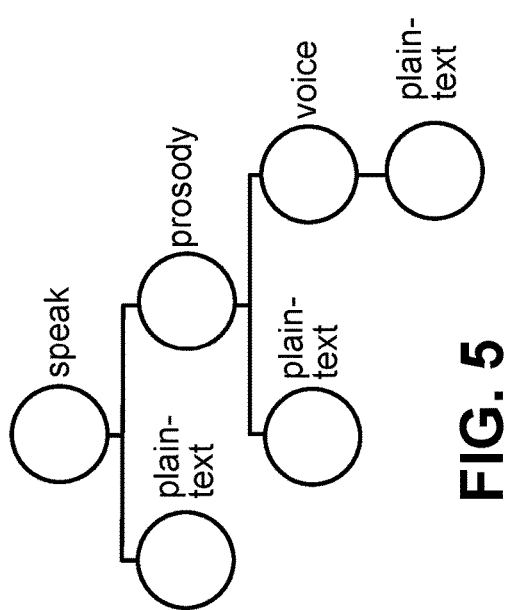

Consider the following SSML string:

```
<speak>
    This is text
    <prosody volume="+2dB">
        Loud text
        <voice name="Brian">
            This is text too
        </voice>
    </prosody>
</speak>
``` which has the tree representation shown in FIG. 5.

Figure 6:
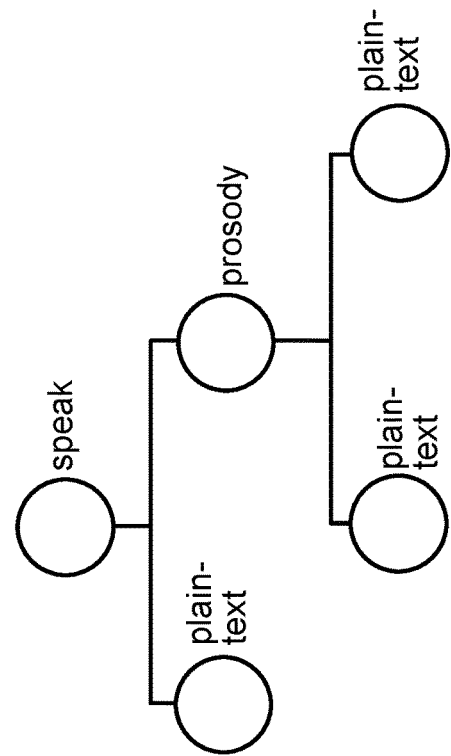

The development platform would segment based on the <voice> element and create two trees (separated segments or branches) as shown in FIG. 6.

In these two separated segments, the development platform has divided the original tree into elements that are fully valid on the left segment, and what would be invalid on the right segment. The segmentation process can then either proceed with just the left branch or it could alter the right branch to remove the <voice> element resulting in the two trees (segments, branches) shown in FIG. 7

Figure 8:
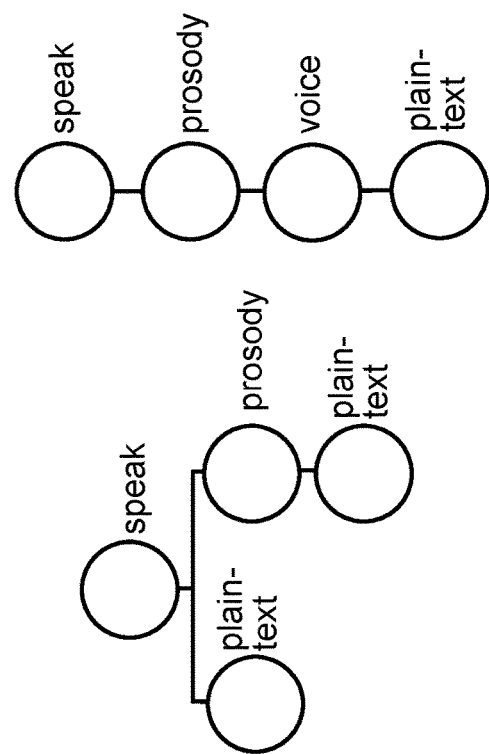

Now both trees will be considered valid and therefore can be merged back together into a single valid tree as shown in FIG. 8.

Now that the new valid tree has been constructed, the development platform can re-assemble it back into a valid SSML string resulting in:

```
<speak>
    This is text
    <prosody volume="+2dB">
        Loud text
        This is text too
    </prosody>
</speak>
```

This string can be provided to the Google assistant platform without violating Google's interpretation of the SSML definition.

The segmenting process also works recursively, so if there are "N" number of nested elements that need to be segmented, it can be broken into "N"+1 trees and appropriately re-assembled by shifting the segmented and removed elements' children up to their original parent elements.

The segmentation process can then be used in tandem with the rule engine to automatically generate a valid SSML string from an invalid SSML string by segmenting the original tree where the rules are broken.

The segmenting process can also be applied separately to allow for using the separated trees to run custom logic. For example, some text-to-speech services support the <audio> element while others don't. So when trying to generate audio files from the SSML that has <audio> elements, the segmentation engine can segment the trees separately, then generate the output speech audio files and keep the audio files separate but in order.

For example, consider the SSML string:

```
<speak>
    <prosody rate="−20%">
        this is slow
        <audio src="https://someurl.com/somefile.mp3"/>
        This is still slow but comes after the audio
    </prosody>
</speak>
```

The segmenting engine would break it into three different SSML strings:

```
<speak>
    <prosody rate="−20%">
        this is slow
    </prosody>
</speak>
<audio src="https://someurl.com/somefile.mp3"/>
<speak>
    <prosody rate="−20%">
        This is still slow but comes after the audio
    </prosody>
</speak>
```

Using these three different strings, the development platform can process them individually for text-to-speech, resulting in three .mp3 files that can be played back to back as one full representation of the entire input.

Visual (Graphical) Tool for Representation and Editing of SSML

Figure 9:
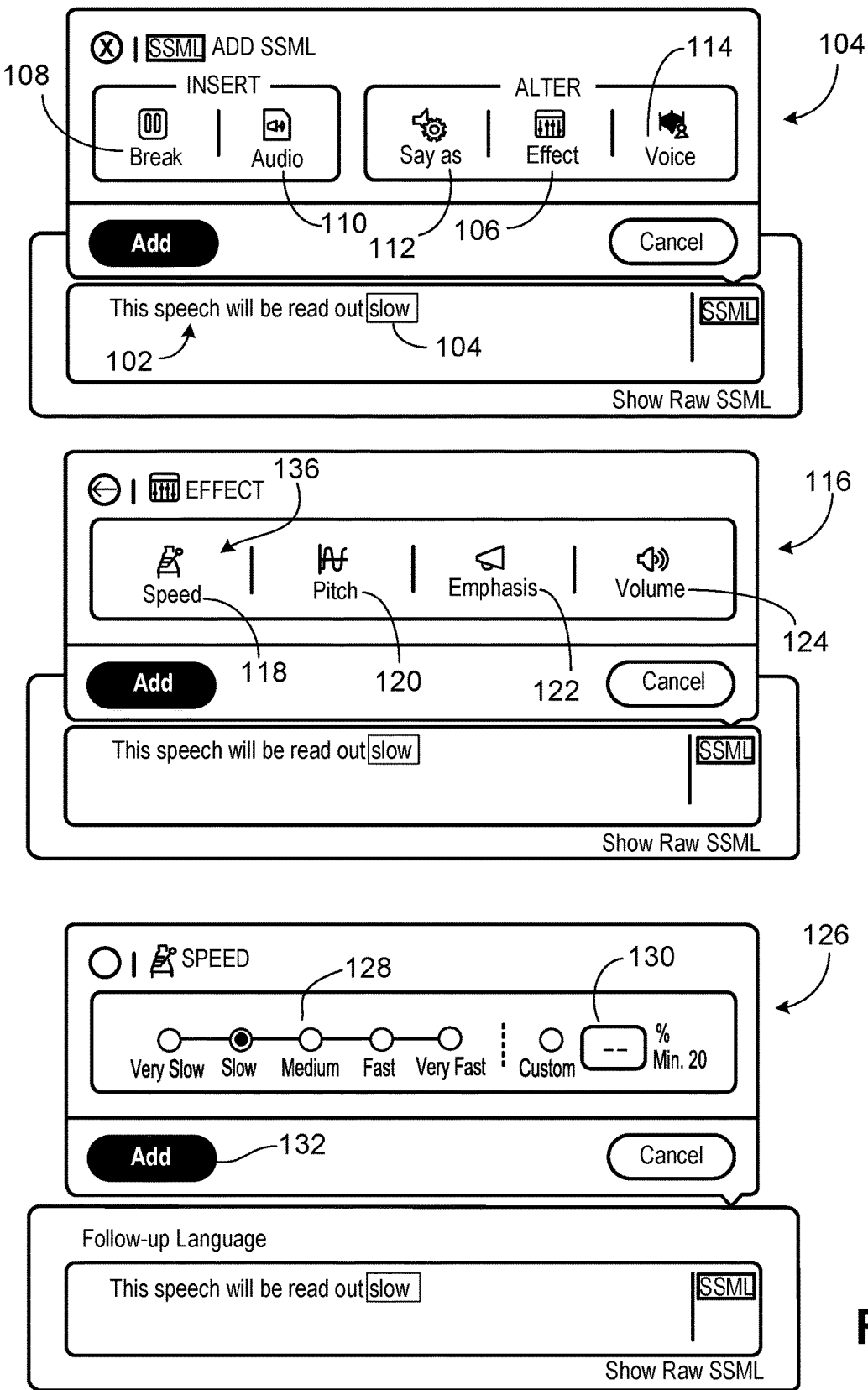
Figure 10:
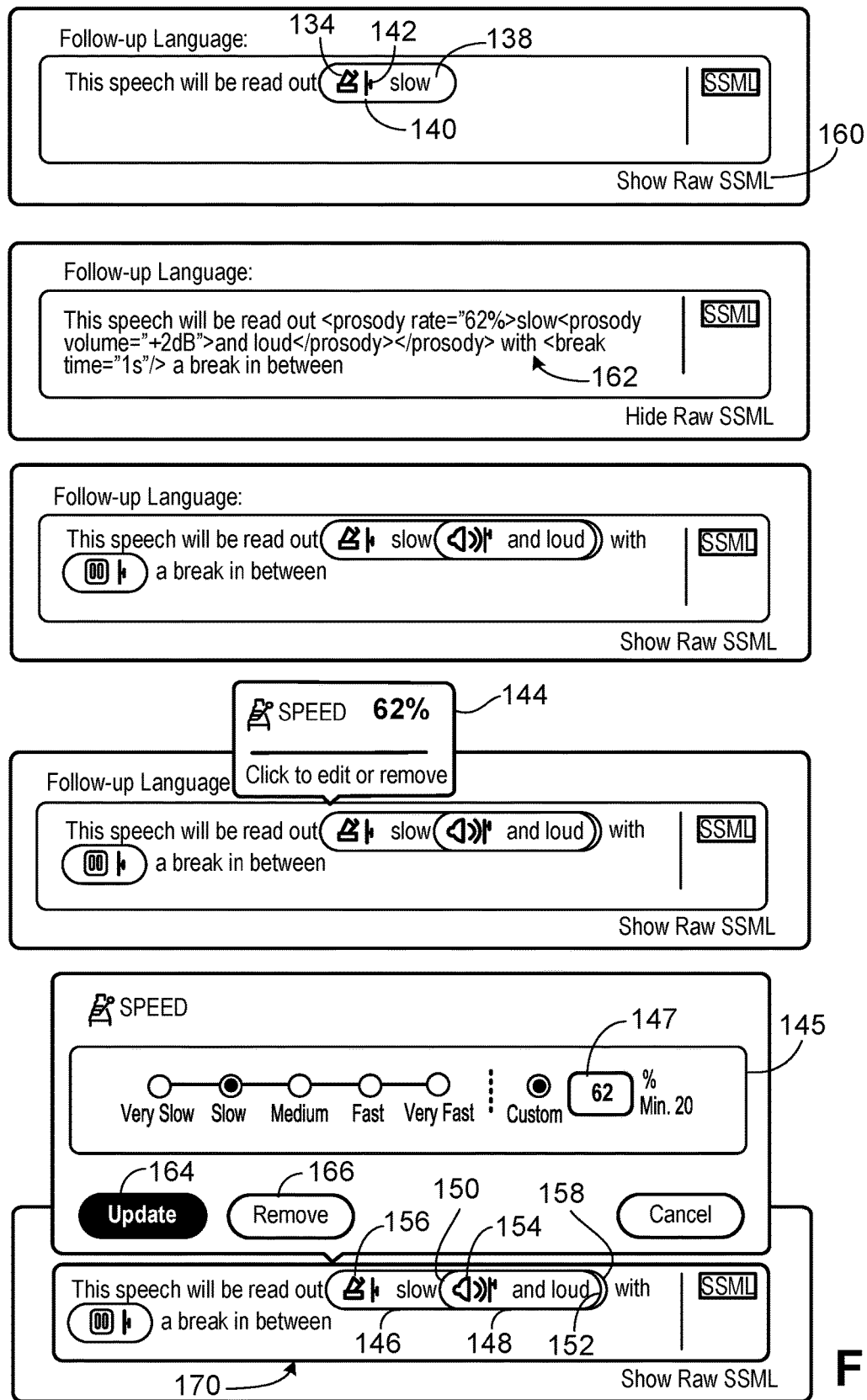

As shown in FIGS. 9 and 10, in order to make the creation and editing of SSML strings easy to do by even a non-technical user without having to understand the elements, rules, and code formatting of SSML, the development platform includes a visual (e.g., graphical) editor (tool) that comprises:
- A visual (e.g., graphical) representation of the SSML structure using
  - Icon representation of each element type
  - Color representation of each element type
  - Shapes and nesting
- A visual tool for adding SSML elements to a string and assigning values to properties having pre-configured settings The visual tool (we sometimes use the term "visual" and the term "graphical" interchangeably) enables a user to add SSML effects to the output SSML string using a menu of supported options. Selecting each of the options causes the menu to be changed to customize the appropriate available properties of that element type.

For example, a user can highlight a word or phrase of text 100 that is part of a sentence 102 to be read in response to an end user of an interaction assistant. The user then can wrap the highlighted piece of text in, for example, a <prosody rate=" . . . "> element by opening an SSML menu 104 and selecting the Effect tool 106. The Effect tool, in this case, is one of three tools (the other two being "say as" 112 and "voice" 114 that are usable to alter highlighted portions of the text. The menu also enables the user to insert a break 108 or audio 110. When the Effect tool is invoked, the menu changes to the submenu 116 which presents icons associated with properties of the element type just selected. In this example, the icons in the submenu 116 include speed 118, pitch 120, emphasis 122, and volume 124. If the user then invokes, for example, the speed icon 118, the menu changes to the submenu 126. The user then can choose one of several pre-selected speeds 128 or can specify a custom speed value 130. Having made a selection or specified a custom speed value, the user can invoke an "Add" option 132 to cause the text in the textbox to be updated to reflect the new SSML element placed in its intended position in the text.

As shown in FIG. 10, the visual representation of SSML presented by the visual tool now includes an icon 134 that graphically suggests or represents the effect the SSML element will add to the highlighted word or phrase of the SSML string. This icon presented in the visual representation matches the same icon 136 used for the element in the menu options. The icon also contains the word or phrase 138 that will be affected by the effect or effects. As explained below, the effects can be nested in the nesting relationship of effects to the word or words affected will be presented in an intuitive manner to the user.

For elements that have a scale value such as rate, pitch, volume, or emphasis, for example, the visual tool presents a small vertical value indicator 140 next to the icon to show where the current value 142 is on the scale. The user of the SSML visual tool can also cause the pointer to hover over the icon or the scale indicator to view a tooltip 144 explaining the details of the element including the name, value, and others. The user can then click the tooltip to open the SSML menu 145 for that element, where the user can edit the given value 147 and then invoke the update control 164, or can remove the effect from the given text by invoking the remove control 166. As shown in the portion of the example 170, the visual tool enables the user to read the text and see the effects that will be applied and how those effects are nested. In this case, after the phrase "This speech will be read out" without any effect, the words "slow and loud" will be read out slowly and the words "and loud" will also be readout loudly. After the word "with" a break is inserted before the phrase "a break in between." As can be seen from the example, the user can easily add, edit, and remove one or more effects, and nest them easily, and can intuitively understand how the effects will be applied in the nested fashion to words and phrases in the sentence.

Along with the interactive icon and scale indicator, the visual representation of the SSML includes color coded backgrounds 146, 148 that correspond to given effects (for example, speed could always be represented by a pink color). These backgrounds also have rounded "pill" shaped ends 150, 152 to help indicate the start and end of a given effect. These visual elements (e.g., pill-shaped icons) can also be nested within each other to show how the SSML elements themselves are nested within one another. For example, a volume icon 154 may be nested within a speed icon 156. When an SSML element is nested as a child within another SSML element, the visual representation will add a small padding 158 to the end of the parent's background "pill" to show that the parent ends when the child element ends.

The visual tool includes a button called "show raw SSML" 160 that can be invoked to show the code version of the SSML string 162 including the markup in-line.

The visual representation can also be edited directly in-line just like a normal textbox, including removing SSML elements by backspacing, or deleting the "pill" entity in the textbox.

FIGS. 9 and 10 show examples of each of the different stages of use of the visual tool including adding a new element to an SSML string having no original elements, nesting elements within each other with each of the elements having its own visual representation, and how the hover and edit states work with the menu re-opening to allow for making changes.

Other Features

The development platform offers a single, abstract representation of an interaction model that enables building and managing a wide range of specific interaction models based on a single consistent format. Developers can rely on the single generic interaction model or if necessary can customize the interaction model within the development platform. The original or customized general interaction model that results from the developer's work can then automatically be translated to syntax required by assistant platforms such as Amazon Alexa and Google Assistant before deployment for use with the different assistant platforms.

Once a specific interaction application has been developed and deployed with particular assistant platforms, the same specific interaction application can be easily deployed to other assistant platforms based on the information stored within the development platform's representation of the general interaction model such as the intents, slots, patterns, and sample utterances. For example, a specific interaction application initially deployed to Amazon Alexa and Google Assistant, can later be deployed to Samsung Bixby based on the development platform's representation of the general interaction model. The platform's general interaction model can be translated and mapped to the Samsung Bixby structure to serve as an interaction model and then subsequently deployed to the Bixby platform using the specific interaction application's developed model.

The development platform's general interaction model leverages generalized, abstract intents and open-ended slot types that provide greater flexibility for utterance matching. This greater flexibility enables other features including that new content can be added without requiring an update to the general interaction model, and therefore without requiring re-deployment or recertification. The ability to create interaction applications without coding enables a broad non-technical user base to create voice, chat, and other interaction applications. The development platform also allows users to manage content without managing business logic, whereas content, business logic, and intents are tightly coupled in custom or flow-based tools.

The development platform can provide additional and custom natural language processing to supplement the natural language processing done by the assistant platform. One reason is that the platform does not require using explicit (non-abstract) intents having data-type specific (non-open-ended) slots, which are limited in functionality and provide less conversational context that can be processed at the development platform.

Figure 11:
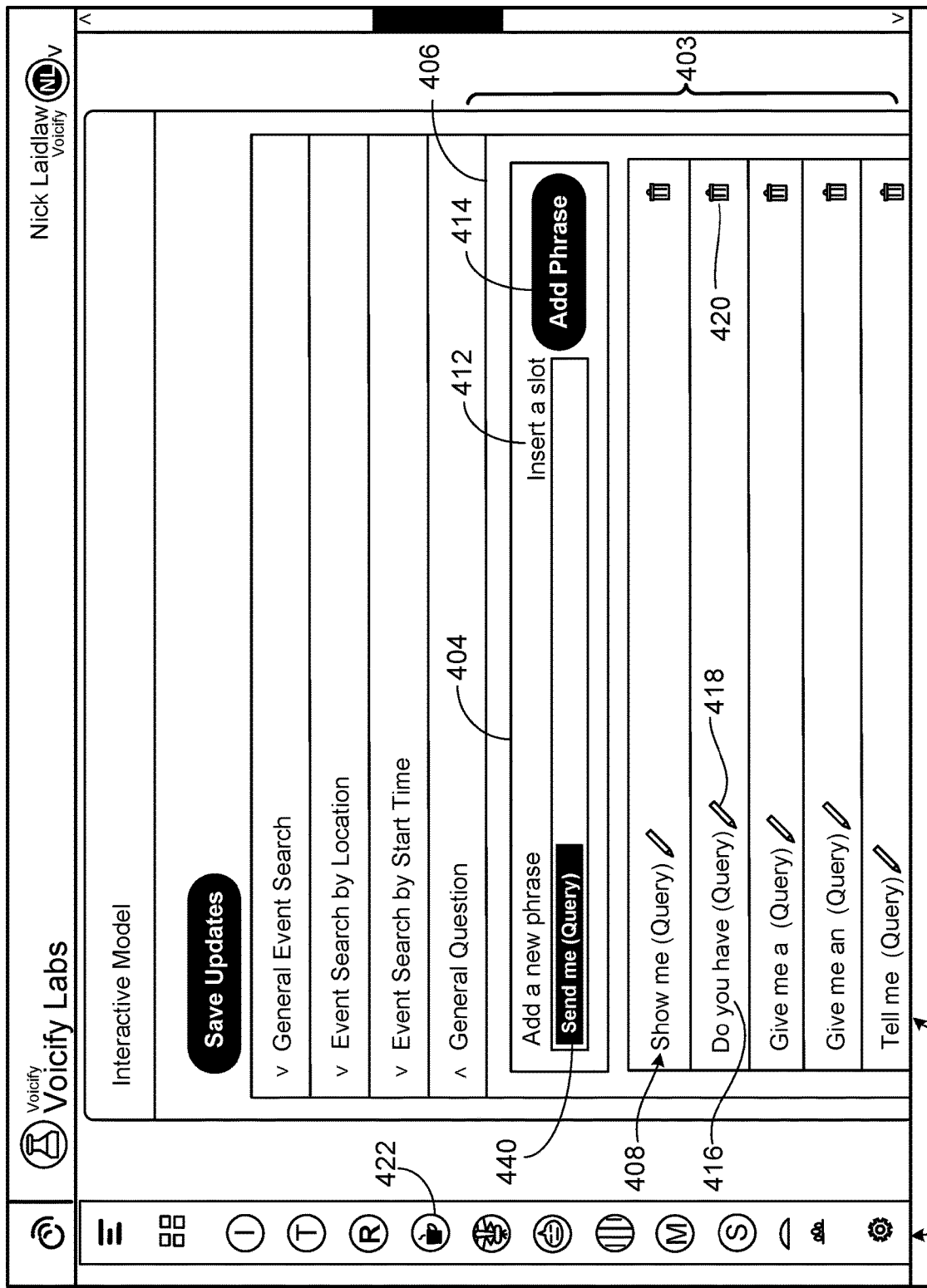

As shown in FIG. 11, in the developer's user interface 402 of the interaction platform, the interaction model page as shown provides a general question control 406. Invoking this control exposes a list 403 of other controls for individual sample utterance patterns 408. The first such control 406 enables the user to add a new phrase (a new sample utterance pattern). The developer can enter the new phrase 410 in the box, can insert one or more slots by clicking the control 412 and, when finished, the developer can click the add phrase control 414 to cause the new phrase to be added to the particular interaction model being worked on.

Each of the other controls for individual sample utterance patterns shows an existing sample utterance pattern 416 and provides a control 418 to enable the developer to edit the phrase and a trash control 420 to enable deleting the sample utterance pattern from the interaction model being developed. In the taskbar 422 on the left side of the page includes icons 423 representing voice applications that have been developed or are being developed for an enterprise. Invoking one of the icons will switch to the user interface to represent features of the corresponding voice application. The capabilities of the development platform are easily extendable; users can update an interaction model simply by providing new sample utterances, without any need to create additional intents and corresponding feature mappings.

Figure 13:
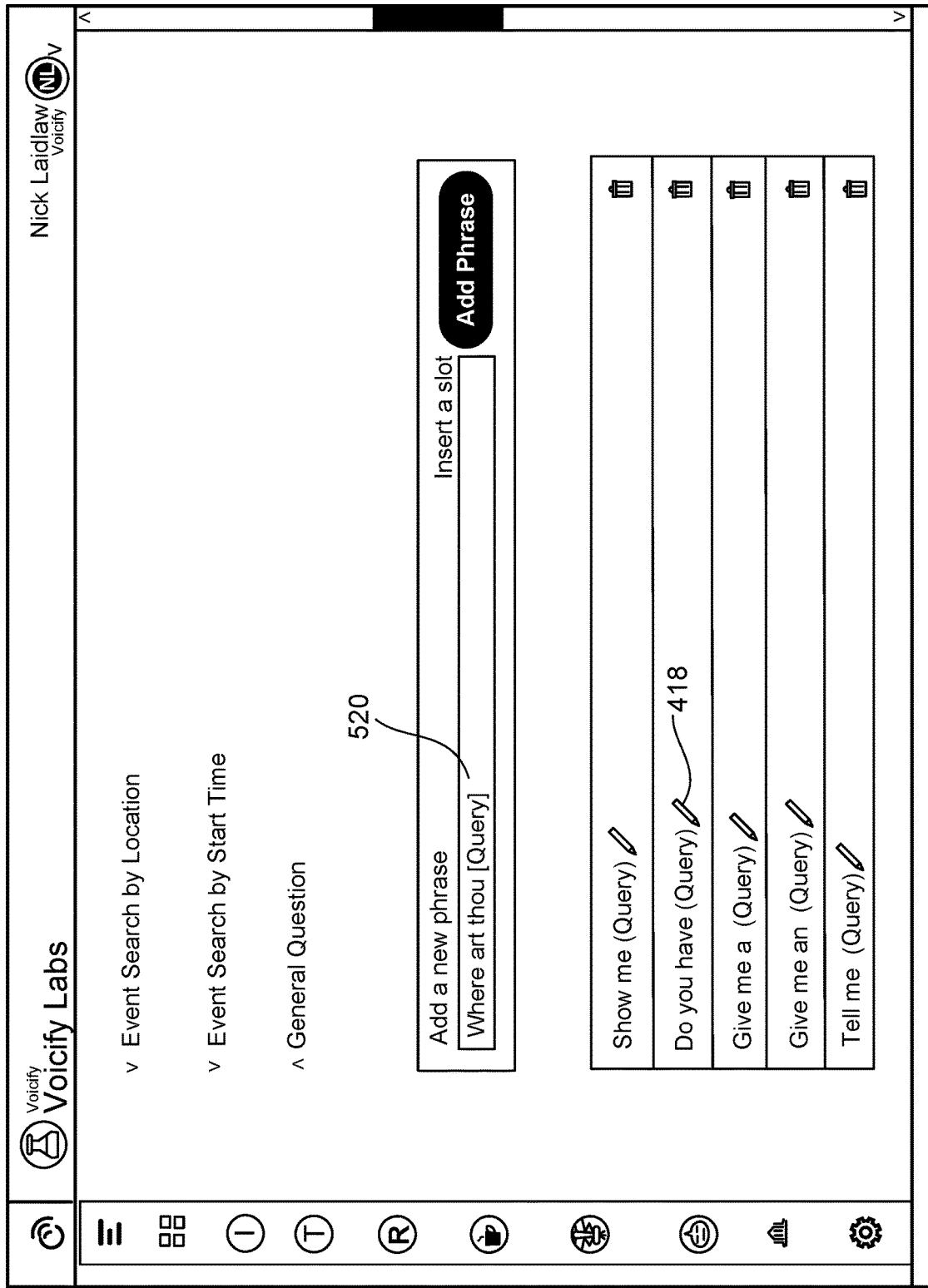

For example, as shown in FIG. 13, the developer could add a new utterance pattern 520 for the phrase "where art thou {Query}".With this additional utterance pattern, the developer can configure any number sample utterances to handle questions that follow the same pattern (in the manner illustrated earlier); such as "where art thou Romeo" or "where art thou my friend whom I met last summer".

Because the development platform does not require an exact match of a spoken phrase (an actual end-user utterance) to a particular sample utterance, the platform can handle thousands of unique items of content with lower risk of conflicts.

Figure 12:
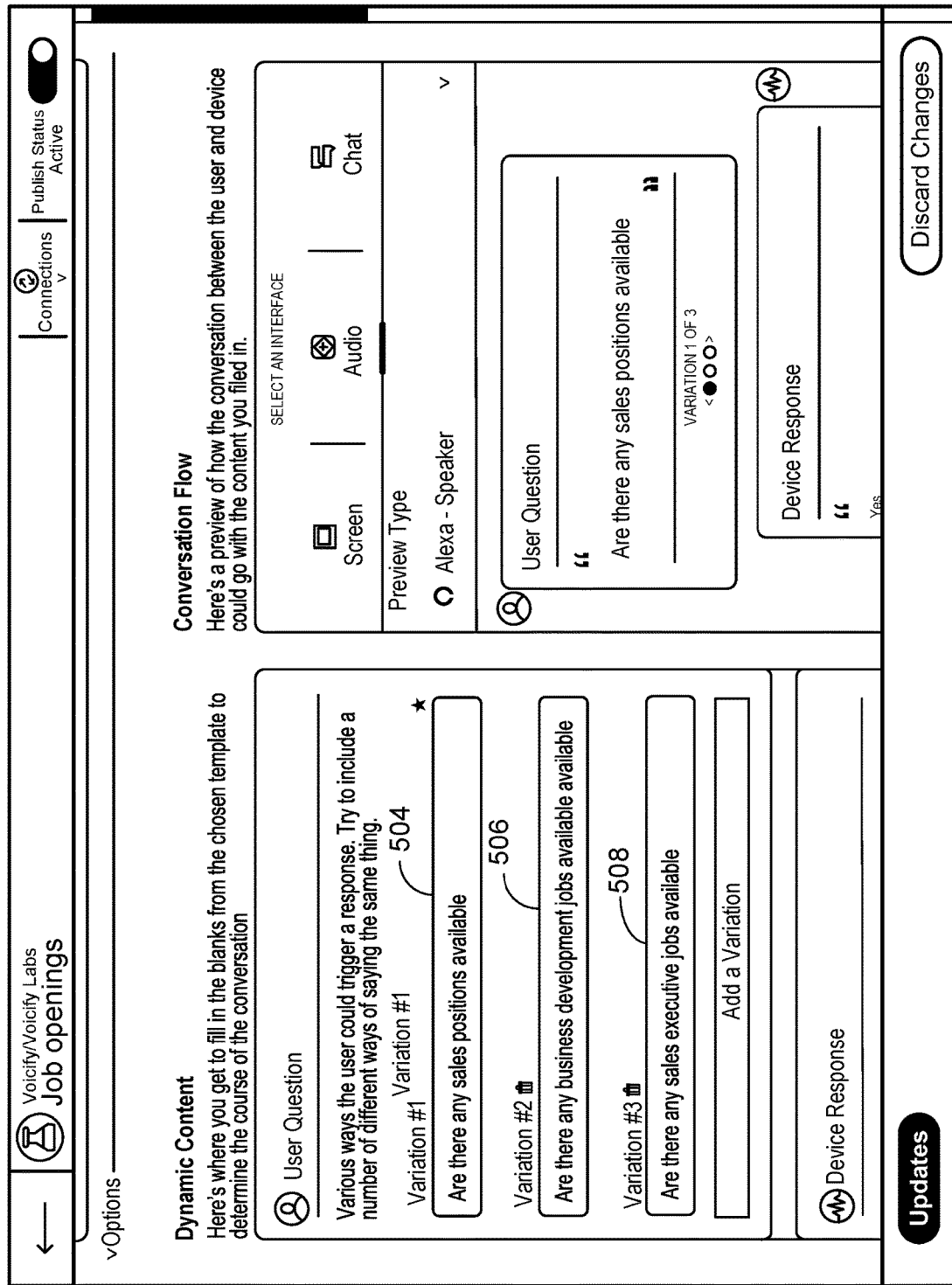

FIG. 12 illustrates a page 502 of the developer's user interface of the interaction platform in which the developer can design a portion of an interaction model. In the example shown, the interaction model being developed is to be used with an interaction application involving job openings. Here, the developer has entered three variations 504, 506, 508 of different sample utterances for a given intent. At run time, the interaction application would find a match for this intent for any of the following end-user requests: "Are there any sales positions", "Are there any sales jobs", "Are there any sales positions available today". The development platform permits entering a few sample utterances for the abstract intents rather than one specific utterance for every potential intent.

The development platform can automate additional utterance pattern suggestions based on the contents of a developer's utterance and machine learning based results from collections of utterance patterns within a specific industry.

As a developer enters a sample utterance the platform can recognize a pattern represented by the sample utterance based on the contents of the sample utterance. As an example, if the developer enters the sample utterance "Are there any sales positions available" (504), the platform can infer that this is an utterance of type General Question together with the key phrase "sales positions available". Based on this information the platform may suggest adding the following sample utterances to cover additional ways an end-user might ask the question about sales positions:

"Is there a sales position available"
"Do you have any sales positions available"
"What are the sales positions available"

The suggested sample utterances are based on sample utterances within the platform's standard interaction model for the General Question type (402).

Automatic utterance pattern suggestion enables other features including the following. The development platform is able to take sample utterance variations from the development platform's stored utterances and compare them with the sample utterances of the open-ended intents (sample utterance patterns) to determine if the utterance variations are valid or not (that is, are explicitly associated with one of the sample utterance patterns). If the sample utterance variation does not fit an existing utterance pattern, then it might not be found during content search. To prevent this, the development platform can suggest adding a new utterance pattern to a customized interaction model based on the utterance variation. This comparison is done using the interaction model's utterance pattern, which contains a few words and then a slot variable and determining if the given new utterance variation fits within the utterance pattern. If it does not fit the exact pattern, the development platform can determine multiple options of new utterance patterns to add to the interaction model's set of utterance patterns. This is done by breaking down the entire new sample utterance into the individual words in the new sample utterance and then determining the most open-ended utterance pattern to add by using 1-3 of the first or last words in the expression that are either verbs or articles. It then creates the new pattern with the slot that would represent the rest of the phrase in the utterance pattern.

For example: if a new sample utterance variation of "I would like to order a box of cookies" was added by a developer, but does not correspond to any of the existing sample utterance patterns, the development platform might suggest something like adding "I would {Query}" to the sample utterance patterns.

The platform can further simplify the creation of utterance patterns based on Machine Learning (ML) models trained on utterance patterns within specific industries. The platform stores interaction models (including the utterance patterns) and categorizes them based on industry vertical. The customized contents of interaction models within a given vertical are used as training data to determine suggested sample utterance patterns for new interaction applications within the same vertical.

FIG. 14, for example, shows three known customers in the healthcare industry A, B, and C. If a majority of healthcare customers (say customer A and customer B in this example) add a common phrase 540 (sample utterance pattern) to their respective interaction applications, the development platform automatically recognizes a correlation between that, sample utterance pattern and a particular vertical industry (healthcare in this example), and is able to begin suggesting this sample utterance pattern for inclusion in interaction applications being developed by other customers in the industry.

For example, over time the interaction platform collects (identifies), utterance patterns used within interaction applications in the healthcare industry. ML models determine that a majority of the applications use distinct common utterance patterns for questions related to ER visits:

"How long do I have to wait to get into the ER"
"What is the wait time for the ER"
"How busy is the ER"

If a developer for an enterprise in the healthcare industry creates a new sample utterance using one of the phrases above, the development platform will automatically suggest to the developer the use of additional utterance patterns based on ML results.

FIG. 15 illustrates an example of customers adding the common sample utterance "ER wait times" which is then suggested 546 by the development platform to remaining customers 548.

FIG. 16 demonstrates how stored sample utterances 550 suggested by customers A, B, and C can be used to suggest similar sample utterances, even to developers of enterprises (customer D) who are not specifically known by the development platform to be in healthcare. "ER wait times" is aphrase that is likely healthcare related and, when the development platform determines that, other industry related phrases that are part of utterance patterns can be suggested 552 for use by the developer.

The development platform stores archived snapshots of the interaction model of each interaction application. The archived snapshots can be useful for a variety of purposes for example as a mechanism for version control and analysis of performance based on utterance failures.

The development platform also uses a more traditional content form style of managing content which does not require a large canvas of intersecting items.

Because the development platform does not require custom coding or implementation or design of endpoint business logic, non-technical administrators create rich conversational experiences more easily while focusing on the content instead.

Other implementations are also within the scope of the following claims

The invention claimed is:

1. A machine-implemented method comprising:
enabling a developer of an interaction application for an enterprise to create items of content to be provided to an assistant platform for use in responses to requests of end-users;
enabling the developer to create a general interaction model comprising sample utterances having slots, the general interaction model configured to parse the requests of the end-users to determine intents associated with the requests, wherein enabling the developer to create the general interaction model comprises providing, to the developer, an interface comprising a text entry area and an invocable element that, when, invoked, causes an open-ended slot to be added to a phrase in the text entry area,
the open-ended slot configured to be fulfilled by clauses that include actions to be interpreted by natural language processing, such that, when the open-ended slot is filled with two or more different possible specific utterances of the end-users, the phrase including the filled open-ended slot corresponds to two or more different respective intents; and
in response to an operation by the developer in the interface, adding code representing the phrase and the open-ended slot to the general interaction model as a new sample utterance,
wherein the interaction application is configured to use the general interaction model to map a received utterance to the new sample utterance, identify a portion of the received utterance that corresponds to the open-ended slot, and parse the portion of the received utterance using natural language processing.

2. The method of claim 1 in which the invocable element comprises a clickable graphic icon.

3. The method of claim 1 in which enabling the developer to create the general interaction model comprises providing, to the developer, a second interface comprising a list of phrase variations corresponding to an intent.

4. The method of claim 3 in which the second interface comprises a second invocable element that, when invoked, causes a new phrase variation corresponding to the intent to be added to the general interaction model.

5. The method of claim 1 in which the new sample utterance comprises an abstract characterization of requests, such that the received utterance cannot be mapped directly to specific content without parsing and interpretation of the portion of the received utterance filling the open-ended slot.

6. The method of claim 1 in which enabling the developer to create the items of content comprises providing, to the developer, a second interface comprising a second text entry area configured to receive spoken response phrases to be spoken by voice assistant devices.

7. The method of claim 6 in which the second interface comprises one or more second invocable elements that, when invoked, initiate a process in which respective audio effects are added to a highlighted portion of a spoken phrase in the second text entry area.

8. The method of claim 6 in which the second interface comprises a second invocable element that, when invoked, causes display of a code representation of a spoken phrase in the second text entry area, wherein the code representation comprises code indicating one or more audio effects added to the spoken phrase.

9. The method of claim 8 in which the code representation comprises speech synthesis markup language code.

10. The method of claim 1, wherein enabling the developer to create the general interaction model comprises associating a speech response to at least one of the requests with a specific prosody value.

11. An apparatus comprising
a processor, and
a memory storing instructions executable by the processor to perform operations comprising:
receiving a first utterance comprising a first phrase and a first slot expression,
receiving a second utterance comprising the first phrase and a second slot expression that is different from the first slot expression the first utterance and the second utterance having been derived by an assistant platform from requests of end-users of interaction assistants, and applying the first utterance and the second utterance to a sample utterance in a general interaction model to determine a first intent corresponding to the first utterance and a second intent corresponding to the second utterance, wherein the second intent is different from the first intent and is applicable in a second domain that is different from a first domain in which the first intent is applicable, the general interaction model comprising, in code representing the general interaction model, the sample utterance, wherein the sample utterance comprises the first phrase and an open-ended slot to which the first slot expression and the second slot expression are mapped, wherein applying the first utterance and the second utterance to the sample utterance in the general interaction model comprises parsing the first slot expression and the second slot expression using natural language processing to determine the first intent and the second intent.

12. The apparatus of claim 11 in which parsing the first slot expression and the second slot expression using natural language processing is secondary natural language processing, the secondary natural language processing distinct from first natural language processing performed on the first phrase and the first slot expression together and on the first phrase and the second slot expression together by the assistant platform.

13. The apparatus of claim 11 in which the natural language processing comprises at least one of key word extraction or sentiment analysis on the first slot expression and the second slot expression.

14. The apparatus of claim 11 in which at least one of the first slot expression or the second slot expression comprises a verb.

15. A machine-implemented method comprising storing content configured to be used by an interaction applications in generating responses to requests from users of interaction assistants, wherein the content comprises a sample utterance, accessing a general interaction model, determining that the sample utterance does not correspond to an existing sample utterance pattern of the general interaction model, based on determining that the sample utterance does not correspond to an existing sample utterance pattern, generating a new sample utterance pattern and providing, to a user, a recommendation to add the new sample utterance pattern to the general interaction model, adding the new sample utterance pattern to the general interaction model, and providing an interaction application for use in responding to intents and slot information received from assistant platforms based on requests from users of interaction assistants, wherein the new sample utterance pattern comprises a phrase and an open-ended slot, wherein the new sample utterance pattern encompasses two or more different possible specific utterances of end-users, the two or more different possible specific utterances being applicable to requests corresponding to two or more different intents, and wherein the sample utterance corresponds to the new sample utterance pattern having a specific clause inserted in the open-ended slot.

16. The method of claim 15 in which providing the recommendation comprises:

breaking down the sample utterance into individual words; and generating the new sample utterance pattern by adjoining the open-ended slot to a set of one or more initial words of the sample utterance or to a set of one or more final words of the sample utterance.

17. The method of claim 16 in which generating the new sample utterance pattern comprises selecting the set of one or more initial words or the set of one or more final words based on a comparison between a first potential sample utterance pattern based on the set of one or more initial words and a second potential sample utterance pattern based on the set of one or more final words.

18. The method of claim 16 comprising selecting the set of one or more initial words or the set of one or more final words based on parts of speech of the set of one or more initial words or the set of one or more final words.

19. The method of claim 15 comprising providing the recommendation using a machine learning model trained to recognize correlations between sample utterance patterns and vertical industries.

20. The method of claim 15, wherein the phrase includes a portion of the sample utterance.

* * * * *